(12) United States Patent
Rabindran et al.

(10) Patent No.: US 12,528,046 B2
(45) Date of Patent: Jan. 20, 2026

(54) HIGH PERFORMANCE CO2 CAPTURE SOLVENT COMPOSITIONS, AND CO2 CAPTURE SYSTEMS AND PROCESSES UTILIZING SAME

(71) Applicant: SUSTEON INC., Cary, NC (US)

(72) Inventors: Aravind V. Rayer Rabindran, Morrisville, NC (US); Shaojun James Zhou, Cary, NC (US); Sujay Someshwar, Cary, NC (US); Raghubir Prasad Gupta, Durham, NC (US)

(73) Assignee: SUSTEON INC., Morrisville, NC (US)

( * ) Notice: Subject to any disclaimer, the term of this patent is extended or adjusted under 35 U.S.C. 154(b) by 0 days.

(21) Appl. No.: 18/967,589

(22) Filed: Dec. 3, 2024

(65) Prior Publication Data

US 2025/0090998 A1 Mar. 20, 2025

Related U.S. Application Data

(63) Continuation-in-part of application No. 18/443,242, filed on Feb. 15, 2024, now Pat. No. 12,172,125.
(Continued)

(51) Int. Cl.
*B01D 53/14* (2006.01)

(52) U.S. Cl.
CPC ..... *B01D 53/1493* (2013.01); *B01D 53/1418* (2013.01); *B01D 53/1425* (2013.01);
(Continued)

(58) Field of Classification Search
CPC ............ B01D 53/1493; B01D 53/1418; B01D 53/1425; B01D 53/1475; B01D 2252/204;
(Continued)

(56) References Cited

U.S. PATENT DOCUMENTS 6,689,332 B1   2/2004   Yoshida et al.
7,601,315 B2   10/2009  Ouimet
(Continued)

FOREIGN PATENT DOCUMENTS

CA     3061855 A1 *   5/2021
WO  2023087066 A1     5/2023

OTHER PUBLICATIONS

Measurement of physical properties of different solutions and investigation of their performance as a solvent for CO2 capture (Year: 2019).*
(Continued)

*Primary Examiner* — Jennifer Dieterle
*Assistant Examiner* — Phillip Y Shao
(74) *Attorney, Agent, or Firm* — HULTQUIST, PLLC; Steven J. Hultquist

(57) ABSTRACT

An aqueous solvent composition useful for $CO_2$ capture is described, that includes one or more $CO_2$-sorbing amines, e.g., an amino acid salt and a tertiary or a sterically hindered amine. The solvent composition may include one or more promoters that are effective to enhance solvent characteristics such as (i) $CO_2$ sorption capacity, (ii) $CO_2$ sorption rate, (iii) $CO_2$ desorption capacity, (iv) $CO_2$ desorption rate, and (v) regeneration temperature, in relation to a corresponding solvent lacking the promoters. In relation to existing $CO_2$ capture solvent compositions, the disclosed aqueous solvent composition provides high solvent $CO_2$ capacity, high rate of $CO_2$ absorption and desorption, high thermal and oxidative stability, low solvent regeneration energy, low solvent emissions, and low solvent toxicity.

30 Claims, 12 Drawing Sheets

Related U.S. Application Data

(60) Provisional application No. 63/516,443, filed on Jul. 28, 2023.

(52) U.S. Cl.
CPC .... *B01D 53/1475* (2013.01); *B01D 2252/204* (2013.01); *B01D 2252/504* (2013.01); *B01D 2252/602* (2013.01); *B01D 2257/504* (2013.01)

(58) Field of Classification Search
CPC ........ B01D 2252/504; B01D 2252/602; B01D 2257/504
See application file for complete search history.

(56) References Cited

U.S. PATENT DOCUMENTS

| | | | |
|---|---|---|---|
| 8,816,078 B2* | 8/2014 | Rochelle | B01D 53/1493 564/511 |
| 9,028,785 B2 | 5/2015 | Kortunov et al. | |
| 12,172,125 B1 | 12/2024 | Rabindran et al. | |
| 2012/0129246 A1 | 5/2012 | Fradette et al. | |
| 2014/0318000 A1 | 10/2014 | Goetheer et al. | |
| 2015/0283502 A1* | 10/2015 | Daigle | C12N 9/88 435/232 |
| 2015/0367281 A1 | 12/2015 | Puxty et al. | |
| 2015/0377772 A1 | 12/2015 | Birks et al. | |
| 2016/0030880 A1 | 2/2016 | Wong et al. | |
| 2016/0271558 A1 | 9/2016 | Laroche et al. | |
| 2021/0197121 A1 | 7/2021 | Sarron et al. | |

OTHER PUBLICATIONS

Kiani, S., et al., "Enhancement of $CO_2$ removal by promoted MDEA solution in a hollow fiber membrane contactor: A numerical and experimental study", Carbon Capture Science & Technology, 2022, https://doi.org/10.1016/j.ccst.2022.1000028, vol. 2, No. 1000028, Publisher: Elsevier.

Lai, Q., et al., "Catalyst-TiO(OH)2 could drastically reduce the energy consumption of $CO_2$ capture", Nature Communications, 2018, DOI: 10/1038/s41467-018-05145-0, vol. 9, No. 2672, Publisher: www.nature.com/naturecommunications.

Sep. 26, 2024 Invitation to Pay Additional Fees issued by the ISA/US in counterpart International Patent Application PCT/US2024/039232.

Ramezani, R., et al., "Density, Viscosity, pH, Heat of Absorption, and $CO_2$ Loading Capacity of Methyldiethanolamine and Potassium Lysinate Blend Solutions", Journal of Chemical Engineering & Data, 2021, pp. 1611-1629, vol. 66, Publisher: ACS Publications.

Ramezani, R., et al., "Kinetics study of $CO_2$ absorption into methyldiethanolamine, potassium lysinate, and their blends in aqueous solution", Chemical Kinetics, 2022, pp. 346-360; https://doi.org/10.1002/kin.21563, Publisher: Wiley Periodicals LLC.

"Codexis, Inc. Final Report 2010-2012, Innovative Materials & Processes for Advanced Carbon Capture Technologies (IMPACCT), DE-FOA 0000208, Low-Cost Biocatalyst for Acceleration of Energy Efficient $CO_2$ Capture Solvents, DE-AR 0000071", Aug. 31, 2012, Publisher: Codexis, Inc.

Ye, X., et al., "$CO_2$ absorption into catalyzed potassium arbonate-bicarbonate solutions: Kinetics and stability of the enzyme carbonic anhydrase as a biocatalyst", Chemical Engineering Science, 2014, pp. 567-575; http://dx.doi.org/10.1016/j.ces.2014.05.040 0009-2509/2014, vol. 116, Publisher: Elsevier Ltd.

* cited by examiner

CO₂ BREAKTHROUGH TEST APPARATUS PROCESS FLOW DIAGRAM

HIGH PERFORMANCE CO2 CAPTURE SOLVENT COMPOSITIONS, AND CO2 CAPTURE SYSTEMS AND PROCESSES UTILIZING SAME

CROSS-REFERENCE TO RELATED APPLICATIONS

This is a continuation-in-part under 35 USC § 120 of U.S. patent application Ser. No. 18/443,242 filed Feb. 15, 2024 in the names of Aravind V. Rayer Rabindran, Shaojun James Zhou, Sujay Someshwar, and Raghubir Prasad Gupta for HIGH PERFORMANCE $CO_2$ CAPTURE SOLVENT COMPOSITIONS, AND $CO_2$ CAPTURE SYSTEMS AND PROCESSES UTILIZING SAME, which in turn claims the benefit under 35 USC § 119 of U.S. Provisional Patent Application 63/516,443 filed Jul. 28, 2023 in the names of Shaojun James Zhou, Raghubir Prasad Gupta, and Aravind V. Rayer Rabindran for HIGH PERFORMANCE $CO_2$ CAPTURE SOLVENT. The disclosures of all such applications are hereby incorporated herein by reference, in their respective entireties, for all purposes.

GOVERNMENT RIGHTS IN THE INVENTION

This invention was made with government support under DE-FE0032216 awarded by the U.S. Department of Energy. The government has certain rights in the invention.

FIELD

The present disclosure relates to solvent compositions useful for $CO_2$ capture, and $CO_2$ capture systems and processes utilizing such solvents. The present disclosure also relates to a class of promoters that enhance $CO_2$ absorption and desorption reactions in the solvent compositions.

DESCRIPTION OF THE RELATED ART

Carbon dioxide ($CO_2$) capture and sequestration is the focus of a vast spectrum of technological efforts to address the billions of tons of $CO_2$ that are generated annually by combustion engine vehicles, power generation plants, and other industrial and commercial processes.

The existing standard process for $CO_2$ capture employs aqueous amine solutions to absorb $CO_2$ from $CO_2$-containing gases that are subjected to gas/liquid contacting with such solutions. Although such process for $CO_2$ capture utilizing aqueous amine solutions has achieved significant implementation, and although various efforts have been made to enhance such process, the current liquid solvent approach has a number of fundamental deficiencies.

Monoethanolamine (MEA) is a commonly used aqueous amine solvent for $CO_2$ capture. This solvent is known to require a large amount of energy to regenerate the $CO_2$ absorbed or $CO_2$ loaded solvent and is highly corrosive at MEA concentrations higher than 30 wt %.

Methyldiethanolamine (MDEA) activated with piperazine (PZ), known as activated MDEA (or known in the art as aMDEA), can be used at concentrations higher than 30 wt % but suffers from slower rate of $CO_2$ absorption and requires a taller absorber column, especially in the treatment of natural gas combined cycle (NGCC) power plant flue gases.

These deficiencies in existing solvent also include problems of aging and degradation of the amine in the solution, with the result that the amine solution must be reclaimed, and with the result of high solvent loss due to emissions of degraded solvent. Furthermore, existing solvents still cannot cost-effectively capture more than 90% of $CO_2$ from power plant and industrial process flue gases, especially NGCC power plant flue gases. The high cost of capture is mainly attributed to the high amine degradation and high energy requirement for solvent regeneration as well as large capital costs (CAPEX) for absorption and desorption columns and associated equipment due to slow rates of $CO_2$ absorption and desorption.

In consequence, there is a continuing and critical need in the art for improved $CO_2$ capture solvents and processes that overcome the aforementioned deficiencies with better performing solvents that have higher rates of $CO_2$ absorption and desorption, lower energy of solvent regeneration, lower rate of degradation, and higher stability.

SUMMARY

The present disclosure relates to amine-based solvent compositions useful for $CO_2$ capture, and $CO_2$ capture systems and processes including such solvent compositions.

The present disclosure also relates to promoters that enhance $CO_2$ absorption and desorption reactions in such amine-based solvent compositions.

In one aspect, the disclosure relates to a mixed amine solvent useful for $CO_2$ capture, comprising the following components mixed with water: methyldiethanolamine (MDEA), potassium lysinate (KLyS), monoethanolamine (MEA), diethanolamine (DEA), aminomethyl propanol (AMP), piperazine (PZ), benzylamine (BZA), other primary, secondary, and tertiary amines, other amino acid salts, cyclic amines, and one or more promoters.

In another aspect, the disclosure relates to promoters that enhance $CO_2$ absorption and desorption reactions in the mixed amine solvent.

In another aspect, the disclosure relates to a method of $CO_2$ capture, comprising contacting a $CO_2$-containing gas with the mixed solvent in a mass transfer device, such as a packed column, to produce $CO_2$-reduced gas, and solvent having $CO_2$ absorbed therein as a rich or $CO_2$-loaded solvent.

In a further aspect, the disclosure relates to a $CO_2$ capture system comprising at least one absorption vessel, wherein the vessel is arranged for contacting the $CO_2$-containing gas with the solvent therein and discharge of $CO_2$-reduced contacted gas.

In another aspect, the disclosure relates to a $CO_2$ capture system comprising at least one desorption vessel, wherein the vessel is arranged for heating the rich solvent to release the absorbed $CO_2$ from the rich solvent and regenerating the solvent to be recycled to the absorption vessel.

In another aspect, the disclosure relates to the production of a gas stream with $CO_2$ concentration greater than 95 mol % from desorption of the rich solvent in the desorption vessel.

The disclosure relates in a further aspect to an aqueous solvent composition for capture of $CO_2$ from $CO_2$-containing gas when in contact therewith, the aqueous solvent composition comprising: an amino acid salt; tertiary or sterically hindered amines or aromatic amines; and a promotor that is effective to enhance reaction of the amino acid salt and the tertiary or sterically hindered or aromatic amines with the $CO_2$ from $CO_2$-containing gas when in contact therewith, for $CO_2$ capture producing contacted $CO_2$-reduced gas.

Another aspect of the disclosure relates to an aqueous solvent composition for capture of $CO_2$ from a $CO_2$-containing gas when in contact therewith, the aqueous solvent composition comprising methyldiethanolamine (MDEA); potassium lysinate (KLyS); and a promotor that is effective to enhance reaction of the MDEA and KLyS with the $CO_2$ from $CO_2$-containing gas when in contact therewith, for $CO_2$ capture producing contacted $CO_2$-reduced gas.

A further aspect of the disclosure relates to an aqueous solvent composition for capture of $CO_2$ from $CO_2$-containing gas when in contact therewith, the aqueous solvent composition comprising methyldiethanolamine (MDEA); potassium lysinate (KLyS); monoethanolamine (MEA); diethanolamine (DEA); aminomethylpropanol (AMP); piperazine (PZ); benzylamine (BZA); other primary, secondary and tertiary amines; and amino acid promoter(s).

Another aspect of the disclosure relates to a system for capture of $CO_2$ from $CO_2$-containing gas, comprising a contacting liquid supply source containing an aqueous solvent composition of the present disclosure, and a gas-liquid contacting apparatus constructed and arranged for contacting the $CO_2$-containing gas from a source thereof with the aqueous solvent composition from the contacting liquid supply source, to produce a $CO_2$-reduced gas, and aqueous solvent composition into which $CO_2$ has been absorptively removed from the $CO_2$-containing gas.

A still further aspect of the disclosure relates to a process for capture of $CO_2$ from $CO_2$-containing gas, comprising contacting the $CO_2$-containing gas with an aqueous solvent composition of the present disclosure, to produce a $CO_2$-reduced gas, and aqueous solvent composition into which $CO_2$ has been absorptively removed from the $CO_2$-containing gas. In such process, the aqueous solvent composition into which $CO_2$ has been absorptively removed from the $CO_2$-containing gas, may be readily regenerated to remove $CO_2$ therefrom to produce a regenerated aqueous solvent composition that can be recirculated to the contacting operation.

Another aspect of the disclosure relates to an aqueous solvent composition for capture of $CO_2$ from a $CO_2$-containing gas when in contact therewith, in which the aqueous solvent composition comprises an amino acid salt, a tertiary or sterically hindered amine, and taurine.

A further aspect of the disclosure relates to a method for capture of $CO_2$ from a $CO_2$-containing gas, comprising contacting the $CO_2$-containing gas with a $CO_2$-sorptive aqueous solvent composition to produce $CO_2$-enriched aqueous solvent composition and $CO_2$-reduced gas, and regenerating the $CO_2$-enriched aqueous solvent composition for use in such contacting by removing $CO_2$ therefrom, wherein the $CO_2$-sorptive aqueous solvent composition may be of any composition as variously described herein.

Other aspects, features and embodiments of the disclosure will be more fully apparent from the ensuing description and appended claims.

BRIEF DESCRIPTION OF THE DRAWINGS

FIG. 2 shows that Sustenol-1 has identical or slightly better $CO_2$ capture rate and capacity as that of 30 wt % MEA which is considered to have the fastest $CO_2$ reaction rate because MEA is a primary amine. Considering that Sustenol has superior characteristics in thermal and oxidative stability, in solvent regeneration energy, in emissions and in toxicity in comparison with MEA, Sustenol-1 is a much superior solvent for $CO_2$ capture than 30 wt % MEA.

FIG. 3 shows that lysine is an effective promoter for 30 wt % MEA.

DETAILED DESCRIPTION

Figure 1:
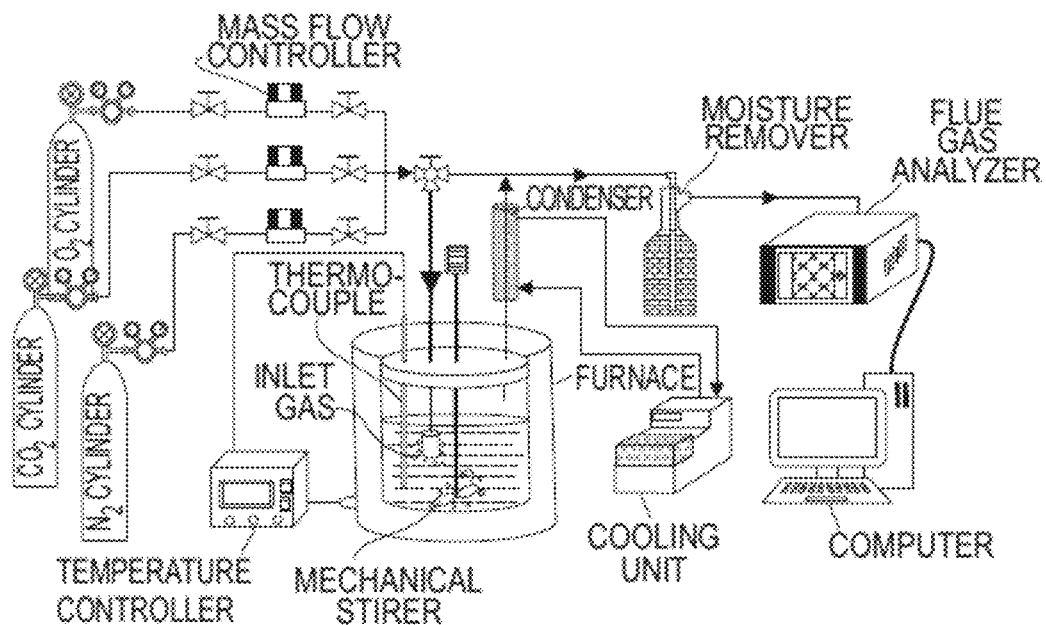
FIG. 1 is a graph of $CO_2$ breakthrough apparatus used for solvent breakthrough testing. The feed gas is fed into the bottom of a sealed vessel containing 250 mL of the solvent to be tested. A stirring bar at the bottom of the vessel stirs the solvent at 300 RPM. The gas exiting the vessel is monitored for $CO_2$ concentration with an infrared $CO_2$ analyzer continuously and the concentration is recorded as a function of time.

The present disclosure relates to solvents useful for $CO_2$ capture, and $CO_2$ capture systems including such solvents.

The present disclosure also relates to a class of promoters that enhance $CO_2$ absorption and desorption reaction rates within the solvents.

It will be appreciated from the subsequent description herein that the $CO_2$ capture solvents and $CO_2$ capture systems and processes of the present disclosure may embody and be implemented with any of a wide variety of elements, features, and arrangements, among those disclosed herein. Correspondingly, it will be appreciated that such solvents and systems and processes may comprise, consist, or consist essentially of any of such elements, features, and arrangements, and that any of such elements, features, and arrangements may be modified or even absent in specific implementations and applications of the present disclosure.

For example, the promoters utilized in the practice of the present disclosure may be restrictively specified in various embodiments, to exclude a specific one or specific ones from among the promoters herein variously disclosed. Likewise, the $CO_2$-absorbing amine utilized in the $CO_2$ capture solvent of the present disclosure may be restrictively specified in various embodiments, to exclude a specific one or specific ones from among the $CO_2$-sorbing amines variously described herein.

As an illustrative example, monoethanolamine may be excluded as a $CO_2$-sorbing amine in various embodiments of the $CO_2$ capture solvent, with reference to particular $CO_2$-sorbing amines designated for such embodiments. As another illustrative example, the $CO_2$-sorbing amine utilized in the $CO_2$ capture solvent may also be restrictively specified in respect of its association with the $CO_2$ capture systems.

It will therefore be appreciated that the constitution, composition, arrangement, performance, and operation of the solvents and systems of the present disclosure may be widely varied based on the substance and scope of the present disclosure, as implemented by persons ordinarily skilled in the art, in the field of the present disclosure.

In all chemical formulae herein, a range of carbon numbers will be regarded as specifying a sequence of consecutive alternative carbon-containing moieties, including all moieties containing numbers of carbon atoms intermediate the endpoint values of carbon number in the specific range as well as moieties containing numbers of carbon atoms equal to an endpoint value of the specific range, e.g., $C_1$-$C_6$, is inclusive of $C_1$, $C_2$, $C_3$, $C_4$, $C_5$ and $C_6$, and each of such broader ranges may be further limitingly specified with reference to carbon numbers within such ranges, as sub-ranges thereof. Thus, for example, the range $C_1$-$C_6$ would be inclusive of and can be further limited by specification of sub-ranges such as $C_1$-$C_3$, $C_1$-$C_4$, $C_2$-$C_6$, $C_4$-$C_6$, etc. within the scope of the broader range.

Thus, the identification of a carbon number range, e.g., in $C_1$-$C_{12}$ alkyl, is intended to include each of the component carbon number moieties within such range, so that each intervening carbon number and any other stated or intervening carbon number value in that stated range, is encompassed, it being further understood that sub-ranges of carbon number within specified carbon number ranges may independently be included in smaller carbon number ranges, within the scope of the disclosure, and that ranges of carbon numbers specifically excluding a carbon number or numbers are included in the invention, and sub-ranges excluding either or both of carbon number limits of specified ranges are also included in the disclosure. Accordingly, $C_1$-$C_{12}$ alkyl is intended to include methyl, ethyl, propyl, butyl, pentyl, hexyl, heptyl, octyl, nonyl, decyl, undecyl and dodecyl, including straight chain as well as branched groups of such types. It therefore is to be appreciated that identification of a carbon number range, e.g., $C_1$-$C_{12}$, as broadly applicable to a substituent moiety, enables, in specific embodiments of the invention, the carbon number range to be further restricted, as a sub-group of moieties having a carbon number range within the broader specification of the substituent moiety. By way of example, the carbon number range e.g., $C_1$-$C_{12}$ alkyl, may be more restrictively specified, in particular embodiments of the disclosure, to encompass sub-ranges such as $C_1$-$C_4$ alkyl, $C_2$-$C_8$ alkyl, $C_2$-$C_4$ alkyl, $C_3$-$C_5$ alkyl, or any other sub-range within the broad carbon number range. In other words, a carbon number range is deemed to affirmatively set forth each of the carbon number species in the range, as to the substituent, moiety, or compound to which such range applies, as a selection group from which specific ones of the members of the selection group may be selected, either as a sequential carbon number sub-range, or as specific carbon number species within such selection group.

In all multicomponent compositions herein, wherein concentrations or concentration ranges of any one or ones of the multiple components are specified by weight percentages, it will be understood that the total of the weight percentages of all components of the multicomponent composition that are present in such composition will be 100 weight percent.

As used herein and in the appended claims, the singular forms "a", "an", and "the" include plural referents unless the context clearly dictates otherwise.

The solvents of the present disclosure are characterized by high $CO_2$ capacity and high $CO_2$ absorption and desorption rates and can be regenerated at temperatures from 80° C. to 150° C. in repeated absorption/desorption cycles, with retention of high $CO_2$ capacity.

The present disclosure reflects the discovery that promoters may be employed to enhance $CO_2$ absorption and desorption characteristics of amine-based $CO_2$ capture solvents, including characteristics of absorption rate, absorption capacity, desorption rate, desorption capacity, and regeneration temperature, in the amine-based $CO_2$ solvent. Promoters, by virtue of their molecular structure, exhibit a number of favorable characteristics in the present application to $CO_2$ solvents, including high chemical/thermal stability, tunable physiochemical characteristics (acid/base sites), low corrosivity, low heat capacity, and environmentally favorable characteristics. In accordance with the present disclosure, promoters are integrated as components in amine-containing solvents to obtain a new generation of $CO_2$ capture solvents with significantly improved absorption/desorption performance and regeneration temperature requirements, e.g., regeneration temperatures on the order of 80° C.-150° C.

Although it was not known or ascertainable, a priori, whether the promoters thereon could or would be effective for improving amine solvents performance for $CO_2$ capture applications, the $CO_2$ capture solvents of the present disclosure have demonstrated remarkably effective $CO_2$ capture capability and regeneration performance, as evidenced by the empirical results more fully described hereinafter.

The present disclosure correspondingly provides a solvent useful for $CO_2$ capture, comprising a mixture of $CO_2$-sorbing amines and promoters thereof. Such $CO_2$ capture solvent may be advantageously utilized in a wide variety of $CO_2$ capture and sequestration applications. For example, $CO_2$ capture applications in which the solvent of the present disclosure can be employed to absorptively remove $CO_2$ from gas mixtures include the illustrative applications listed in Table 1 below, as identified with representative $CO_2$ concentrations encountered in such applications, although the disclosure is not limited thereto.

TABLE 1

Illustrative CO$_2$ Capture Applications
and Representative CO$_2$ Concentrations

| Applications | CO$_2$ Concentration in Gas Stream |
|---|---|
| Coal-fired power plant flue gas | 10 to 15 vol % |
| Natural gas combined cycle (NGCC) power plant flue gas | 3 to 5 vol % |
| Blast furnace exhaust gas | 17 to 21 vol % |
| Cement plant exhaust gas | 15 to 25 vol % |
| Natural gas fired once through steam generator | 8 to 10 vol % |
| Integrated gasification combined cycle (IGCC) syngas | 18 to 40 vol % |
| Syngas from steam methane reforming | 18 to 25 vol % |
| Steam methane reforming flue gas | 8 to 22 vol % |
| Steam methane reforming pressure swing adsorption tail gas | 40 to 50 vol % |
| Syngas from biomass gasification | 9 to 25 vol % |
| Syngas from municipal waste gasification | 20 to 30 vol % |
| Biogas | 30 to 60 vol % |

In the solvent of the present disclosure, the CO$_2$-sorbing amines that may be advantageously employed in various embodiments of the present disclosure include primary, secondary, and tertiary alkylamines and alkanolamines, amino acids, amino acid salts, aromatic amines, mixed amines, polyamines, and combinations thereof. The amines are advantageously of a low volatility character under the conditions under which it is employed for CO$_2$ absorption and desorption, and to which it is otherwise exposed, to minimize and preferably to avoid amine emissions that may contaminate the gas streams with which it is contacted, and/or reduce the effectiveness of the CO$_2$ absorption system over time.

By way of illustrative example, the CO$_2$-sorbing amines in the solvent compositions of the present disclosure may comprise one or more amine(s) such as monoethanolamine (MEA), benzylamine (BZA), diglycolamine (DGA), triethanolamine (TEA), diethanolamine (DEA), diethylenetriamine (DETA), 2-(2-aminoethylamino)ethanol, diisopropanolamine (DIPA), 2-amino-2-methyl-1,3-propanediol, pentaethylenehexamine, tetramethylenepentaamine, tetraethylenepentamine (TEPA), methyldiethanolamine (MDEA), potassium lysinate (KLyS), aminomethyl propanol (AMP), piperazine (PZ), as well as other primary, secondary and tertiary amines, amino acid salts, and cyclic amines, with such CO$_2$-sorbing amine(s) being utilized with one or more promoters.

In various embodiments, the solvent composition comprises the main components of methyldiethanolamine (MDEA), potassium lysinate (KLyS), one or more promotors, and water.

In various specific embodiments of the solvent composition, the CO$_2$-sorbing solvent composition comprises the main components of methyldiethanolamine (MDEA), potassium lysinate (KLyS), water, and one or more promoters, wherein the solvent composition further comprises piperazine (PZ).

In various other specific embodiments of the solvent composition, the CO$_2$-sorbing solvent composition can further comprise one or more of the following components in addition to the main components of methyldiethanolamine (MDEA), potassium lysinate (KLyS), water, and one or more promoters, to tailor the solvent composition properties such as enhancing absorption and/or desorption characteristics, CO$_2$ capture amount, and/or desorption energy characteristics thereof, for specific CO$_2$ containing gas streams: piperazine (PZ), monoethanolamine (MEA), aminomethyl propanol (AMP), triethanolamine (TEA), diethanolamine (DEA), diethylenetriamine (DETA), 2-(2-aminoethylamino) ethanol, diisopropanolamine (DIPA), 2-amino-2-methyl-1,3-propanediol, pentaethylenehexamine, tetramethylenepentaamine, tetraethylenepentamine (TEPA), and other components with CO$_2$ sorptive properties.

The main components of methyldiethanolamine (MDEA), potassium lysinate (KLyS), piperazine (PZ), water, and one or more promoters may be present in any suitable concentrations in the solvent composition, which are effective to enable the aqueous solvent composition to absorb CO$_2$ from CO$_2$-containing gas steams with enhanced absorption and/or desorption characteristics and/or desorption energy characteristics thereof. In various embodiments, the MDEA may be present in the solvent composition at concentrations from 5 to 45% by weight, or from 10 to 25% by weight, or other suitable concentration, and the KLyS may be present in the solvent composition at concentrations from 5 to 25% by weight, from 10 to 20% by weight, or other suitable concentration, each of the foregoing concentrations being based on total weight of the solvent. The water may be present in the solvent composition at concentrations from 10 to 70% by weight, from 25 to 70% by weight, from 45 to 70% by weight, or other suitable concentration, each of such water concentrations being based on total weight of the solvent composition (including the water in such total weight).

The above-mentioned optional components may be present in any suitable concentrations in the solvent composition, as desired and effective to tailor the solvent composition properties, such as enhancing absorption and/or desorption characteristics, CO$_2$ capture percentages, and/or desorption energy characteristics thereof, for specific CO$_2$-containing gas streams. In various embodiments, the optional components may be present in the solvent composition at concentrations of from 0 to 15% by weight based on total weight of the solvent composition. In other embodiments, the optional components may be present in the solvent composition at concentrations of from 0 to 5% by weight based on total weight of the solvent. In still other embodiments, the optional components may be present in the solvent composition at concentrations of from 0 to 2% by weight based on total weight of the solvent.

In like manner, the promoters in the CO$_2$ capture solvent composition of the present disclosure may be of any suitable type and composition that are effective in the solvent to enhance CO$_2$-absorption, CO$_2$-desorption, and/or regeneration temperature characteristics of the CO$_2$ capture solvent, as compared to a corresponding CO$_2$ capture solvent composition lacking the promoters therein. Thus, for example, the promoters may include promoters that are interactive with the CO$_2$-sorbing amine to enhance at least one of the solvent characteristics of (i) CO$_2$ absorption capacity, (ii) CO$_2$ absorption rate, (iii) CO$_2$ working capacity, and (iv) CO$_2$ desorption rate in relation to a corresponding solvent lacking the promoters.

Illustrative promoters that may be employed in various embodiments of the present disclosure include all amino acids and particularly the common amino acids: alanine, arginine, asparagine, aspartic acid, cysteine, glutamic acid, glutamine, glycine, histidine, isoleucine, leucine, lysine, methionine, phenylalanine, proline, serine, taurine, threonine, tryptophan, tyrosine, and valine.

In particular embodiments of the present disclosure, the promoters may comprise promoters with the formula:

$R_1R_2N$—$R_3$—COOH, wherein each of $R_1$, $R_2$ and $R_3$ is independently selected from H, $C_1$-$C_{12}$ alkyl, $C_1$-$C_{12}$ alkoxy, $C_1$-$C_{12}$ carboxy, $C_1$-$C_{12}$ haloalkyl, $C_6$-$C_{12}$ aryl, $C_6$-$C_{14}$ arylalkyl, $C_5$-$C_{10}$ cycloalkyl, amino or substituted amino, thiol, phosphate, sulfate, phosphonate, and sulfonate. In particular embodiments, each of $R_1$, $R_2$ and $R_3$ is independently selected from H and $C_1$-$C_{12}$ alkyl.

The promoters may be present in any suitable concentrations in the solvent composition, which are effective to enhance the absorption and/or desorption characteristics and/or desorption temperature characteristics thereof. In various embodiments, the promoters may be present in the solvent composition at concentrations of from 1 to 300,000 ppm by weight, based on total weight of the solvent. In various other embodiments, the promoters may be present in the solvent composition at concentrations of from 1 to 50,000 ppm by weight, based on total weight of the solvent. In other embodiments, the promoters may be present in the solvent at concentration of from 1 to 10,000 ppm by weight, based on total weight of the solvent. In still other embodiments, the promoters may be present in the solvent at concentration of from 1 to 1,000 ppm by weight, based on total weight of the solvent. In various other embodiments, promoters may be employed at concentration up to 10% by weight, e.g., in a range of from 0.1 to 10% by weight, or in a range of from 0.5 to 10% by weight, or in a range of from 1 to 5% by weight, or up to 5% by weight, or in other suitable weight range, each of such weight percent concentrations of the promotor being based on total weight of the aqueous solvent composition. It will be appreciated that the concentration of the promoters may be widely varied in the practice of the present disclosure.

The aqueous solvent composition in various embodiments may be constituted as comprising an amino acid salt at a concentration of from 10 to 40% by weight, a tertiary amine at a concentration of from 2 to 30% by weight, an amino acid promoter at a concentration of from 0.01 to 5% by weight, water at a concentration of from 45 to 60% by weight, and optionally additional amines comprising one or more selected from the group consisting of primary amines, secondary amines, and cyclic amines, wherein the concentration of each of the ingredients in the aqueous solvent composition is based on the total weight of the aqueous solvent composition, and the weight percentages of all ingredients in the aqueous solvent composition total to 100 weight percent.

The disclosure in a further aspect relates to a method of $CO_2$ capture, comprising contacting a $CO_2$-containing gas with the solvent composition, e.g., in a packed column, trayed column, or in a rotating packed bed mass transfer device, to produce $CO_2$-reduced gas, and solvent having $CO_2$ absorbed therein.

Such $CO_2$ capture method may in specific embodiments further comprise regenerating the solvent composition having $CO_2$ absorbed therein, e.g., using a packed column, trayed column, or a rotating packed bed mass transfer device, equipped with a reboiler to heat the $CO_2$ absorbed ($CO_2$-enriched) solvent composition to a temperature in a range of from 80° C. to 150° C. to desorb $CO_2$ therefrom to form regenerated ($CO_2$-reduced, or $CO_2$-lean) solvent, and $CO_2$ desorbate; and recovering the $CO_2$ desorbate from the regenerated solvent.

In specific embodiments, the $CO_2$ capture method of the disclosure may be carried out wherein the $CO_2$-containing gas is a $CO_2$-containing gas supplied from a combustion process, e.g., wherein the $CO_2$-containing gas comprises effluent from an electrical power-generating plant or other $CO_2$-containing gas resulting from combustion of fossil fuel, syngas from organic matter gasification, blast furnace exhaust gas from steel making, cement kiln exhaust gas, aluminum smelting off gas, effluent from a motive vehicle, etc.

In other embodiments, wherein the $CO_2$-containing gas is supplied from an oxidation process, such as a biological oxidation process, or other process in which oxidative action or chemical reaction is conducted.

In various other embodiments, the $CO_2$-containing gas may comprise one or more of: coal-fired power plant flue gas;
natural gas combined cycle power plant flue gas;
blast furnace exhaust gas;
cement plant exhaust gas;
natural gas fired once through steam generator gas;
steam methane reformer syngas;
steam methane reformer flue gas;
steam methane reformer PSA tail gas;
dry reforming syngas;
integrated gasification combined cycle (IGCC) syngas;
biogas;
biomass gasification syngas;
municipal waste gasification syngas;
aluminum smelting off gas;
motive vehicle effluent; and
electrical power-generating plant effluent.

The disclosure in various aspects contemplates an aqueous solvent composition for capture of $CO_2$ from $CO_2$-containing gas when in contact therewith, the aqueous solvent composition comprising: an amino acid salt; a tertiary or a sterically hindered amine; and one or more promotor that is effective to enhance reaction of the amino acid salt and the tertiary or sterically hindered amine with the $CO_2$ from a $CO_2$-containing gas when in contact therewith, for $CO_2$ capture producing contacted $CO_2$-reduced gas.

In various embodiments, the aqueous solvent composition may be constituted with the amino acid salt comprising an alkali metal amino acid salt, such as a sodium or potassium amino acid salt, but the disclosure is not limited thereto. In other embodiments, the amino acid salt may comprise an alkaline earth metal amino acid salt, such as a calcium or magnesium amino acid salt. It is to be recognized that various alkaline earth metal amino acid salts may have limited water solubility in the aqueous solvent composition, and that the alkaline earth metal amino acid salt should therefore be an alkaline earth metal amino acid salt of suitable effective water-soluble character.

In the aqueous solvent composition of the disclosure, the amino acid salt may be of any suitable type, and may for example comprise a salt of an amino acid selected from the group consisting of alanine, arginine, asparagine, aspartic acid, cysteine, glutamic acid, glutamine, glycine, histidine, isoleucine, leucine, lysine, methionine, phenylalanine, proline, serine, taurine, threonine, tryptophan, tyrosine, and valine. In various embodiments, the amino acid salt comprises potassium lysinate.

The aqueous solvent composition of the disclosure in various embodiments may be constituted with the promotor comprising a compound selected from the group consisting of amino acids and organic acid amines. The amino acids may be of any suitable type, and may for example comprise an amino acid selected from the group consisting of alanine, arginine, asparagine, aspartic acid, cysteine, glutamic acid, glutamine, glycine, histidine, isoleucine, leucine, lysine, methionine, phenylalanine, proline, serine, taurine, threonine, tryptophan, tyrosine, and valine. In embodiments in which the promotor comprises an organic acid amine, the organic acid amine may be of any suitable type, and may for example include an amine of an organic acid selected from the group consisting of succinic acid, maleic acid, fumaric acid, and glutamic acid. In various embodiments, the promotor comprises taurine or lysine.

In the aqueous solvent compositions of the present disclosure, the tertiary or sterically hindered amine may be of any suitable type and may for example comprise methyldiethanolamine (MDEA) or other suitable amine. The aqueous solvent composition may be constituted with the tertiary or sterically hindered amine present at concentration that may for example be in a range of from 10% to 40% by weight, or from 5 to 35% by weight, or from 5 to 30% by weight, or from 5 to 25% by weight, or from 5 to 20% by weight, or from 5 to 15% by weight, or from 5 to 10% by weight, based in each case on total weight of the aqueous solvent composition, although the disclosure is not limited thereto, and other concentration values or concentration ranges may be employed in the broad practice of the present disclosure.

In the aqueous solvent compositions of the present disclosure, the amino acid salt may be present at any suitable concentration, e.g., concentration in a range of from 2% to 30% by weight, based on total weight of the aqueous solvent composition, although the disclosure is not limited thereto, and other concentrations within or outside of such concentration range may be utilized, e.g., concentration in a range of from 2% to 25% by weight, or from 5% to 25% by weight, or from 10% to 25% by weight, from 10% to 20% by weight, based in each case on total weight of the aqueous solvent composition.

The aqueous solvent composition may be formulated to comprise additional amines other than the tertiary or sterically hindered amine. For example, the composition may comprise monoethanolamine (MEA), which may be present at suitable concentration, such as up to 1%, 2%, 3%, 4%, 5%, 6%, 7%, 8%, 9%, 10%, by weight, or at 10 to 15% by weight, or at 10 to 20% by weight, based in each case on total weight of the aqueous solvent composition, although the disclosure is not limited thereto, and other concentrations may be employed in the broad practice of the present disclosure. In other embodiments, the aqueous solvent composition may be formulated to include aminomethyl propanol (AMP), piperazine (PZ), triethanolamine (TEA), diethanolamine (DEA), diethylenetriamine (DETA), 2-(2-aminoethylamino) ethanol, diisopropanolamine (DIPA), 2-amino-2-methyl-1,3-propanediol, pentaethylenehexamine, tetramethylenepentaamine, or tetraethylenepentamine (TEPA), at the same concentration values and ranges as those of MEA based on total weight of the aqueous solvent composition, or at other suitable concentration values and ranges.

In various embodiments of the aqueous solvent composition, the promotor may be present at any suitable concentration, such as the concentrations previously described, or at other appropriate concentrations. Single or multiple promoters may be utilized in the aqueous solvent composition in various embodiments of the disclosure.

The aqueous solvent composition in various embodiments is constituted to comprise a promoter that is effective for mediating or enhancing reaction of the amino acid salt and the tertiary or sterically hindered amine with the $CO_2$ from $CO_2$-containing gas when in contact therewith, for $CO_2$ capture producing contacted $CO_2$-reduced gas. Promoter(s), e.g., amino acids, may be employed for such purpose at any suitable concentrations, as for example concentrations up to 1%, 2%, 3%, 4%, or 5% by weight, or up to 10% by weight, or in a range of from 1% to 10% by weight, or from 1 to 5% by weight, or from 2% to 10% by weight, based in each case on total weight of the aqueous solvent composition.

In various embodiments, the disclosure relates to an aqueous solvent composition for capture of $CO_2$ from a $CO_2$-containing gas when in contact therewith, wherein the aqueous solvent composition comprises: methyldiethanolamine (MDEA); potassium lysinate (KLyS); and a promotor that is effective to enhance reaction of the MDEA and KLyS with the $CO_2$ from $CO_2$-containing gas when in contact therewith, for $CO_2$ capture producing contacted $CO_2$-reduced gas. Such aqueous solvent composition may be formulated, in which MDEA is present at concentration in a range of from 5% to 40% by weight, and KLyS is present at concentration in a range of from 2% to 30% by weight, based on total weight of the aqueous solvent composition, although the disclosure is not limited thereto and other concentrations of MDEA and KLyS may be employed. The aqueous solvent composition may further comprise one or more selected from the group consisting of primary, secondary and tertiary amines such as: monoethanolamine (MEA); diethanolamine (DEA); aminomethylpropanol (AMP); piperazine; and other primary, secondary and tertiary amines, together with one or more promoter that is effective to promote reaction of the KLyS and the MDEA with $CO_2$ from $CO_2$-containing gas when in contact therewith, for $CO_2$ capture producing contacted $CO_2$-reduced gas.

The aqueous solvent composition described above may include MEA at any suitable concentrations, e.g., concentration of from 1% to 15% by weight, based on total weight of the aqueous solvent composition. BZA may be present in the aqueous solvent composition at any suitable concentrations, e.g., concentration of from 1% to 15% by weight, based on total weight of the aqueous solvent composition. AMP likewise may be employed in the aqueous solvent composition at any suitable concentrations, such as for example concentration of from 1% to 15% by weight, based on total weight of the aqueous solvent composition. Piperazine may be present in the aqueous solvent composition at any suitable concentrations, e.g., concentration of from 1% to 15% by weight, based on total weight of the aqueous solvent composition. Promoter may be present in the aqueous solvent composition at any suitable concentrations, and may for example be at concentration of from 1% to 15% by weight, based on total weight of the aqueous solvent composition. The foregoing MEA, BZA, AMP, piperazine, and promoter concentrations are of illustrative character only, and concentrations inside or outside of such ranges may be used in specific formulations of the aqueous solvent composition.

The aqueous solvent composition may thus comprise one or more additional amines, other than the tertiary or sterically hindered amines, such as MEA, DEA, BZA, AMP, PZ, and other primary amines, secondary amines, amino acid salts, and cyclic amines, and such additional amines may be present at any suitable concentration, such as from 0.1% by weight to 1%, 2%, 3%, 4%, 5%, 6%, 7%, 8%, 9%, or 10%, by weight, or from 10% to 15% by weight, or from 10% to 20% by weight, such weight percentages based in each case on total weight of the aqueous solvent composition, although the disclosure is not limited to such concentrations, and other concentrations may be utilized in the broad practice of the present disclosure.

In specific formulations of the aqueous solvent composition for capture of $CO_2$ from $CO_2$-containing gas when in contact therewith, the aqueous solvent composition comprises: methyldiethanolamine (MDEA); potassium lysinate (KLyS); monoethanolamine (MEA); diethanolamine (DEA); aminomethylpropanol (AMP); piperazine; benzylamine (BZA); and one or more promoters; and the aqueous solvent composition may optionally further comprise one or more selected from the group consisting of other primary amines, secondary amines, tertiary amines, amino acids, amino acid salts, and cyclic amines.

In a surprising aspect, the use of amino acid salt and a tertiary or a sterically hindered amine as the main components of the $CO_2$ capture solvent provides the solvent with high rate of $CO_2$ reaction.

In another aspect, the use of amino acid salt and a tertiary or a sterically hindered amine as the main components of the $CO_2$ capture solvent provides the solvent with high oxidative, thermal, and hydrothermal stability for reduced solvent loss and emissions.

A further aspect of the disclosure relates to a system for capture of $CO_2$ from $CO_2$-containing gas, comprising a contacting liquid supply source containing an aqueous solvent composition according to the present disclosure, and a gas-liquid contacting apparatus constructed and arranged for contacting the $CO_2$-containing gas from a source thereof with the aqueous solvent composition from the contacting liquid supply source, to produce a $CO_2$-reduced gas, and aqueous solvent composition into which $CO_2$ has been absorptively removed from the $CO_2$-containing gas.

In embodiments of such system, the contacting liquid supply source may comprise a contacting liquid supply vessel connected by flow circuitry to the gas-liquid contacting apparatus. The gas-liquid contacting apparatus may comprise a vessel in which a mechanical mixer and a gas sparging device are disposed, or may comprise a packed bed to which the aqueous solvent composition from the contacting liquid supply source is flowed for passage over packing in the packed bed, and to which $CO_2$-containing gas from the source thereof is flowed for gas-liquid contacting with the aqueous solvent composition in the packed bed, with the packed bed comprising an outlet for discharge of the $CO_2$-reduced gas, although the disclosure is not limited thereto. The system in various embodiments may further comprise a desorption vessel arranged to receive aqueous solvent composition into which $CO_2$ has been absorptively removed from the $CO_2$-containing gas, and a heater arranged to heat in the vessel the aqueous solvent composition into which $CO_2$ has been absorptively removed from the $CO_2$-containing gas, for desorption of $CO_2$ therefrom to produce a regenerated aqueous solvent composition, e.g., with recycle flow circuitry arranged to recirculate the regenerated aqueous solvent composition to the gas-liquid contacting apparatus.

In other embodiments of the present disclosure, there is provided a process of capturing $CO_2$ from a $CO_2$-containing gas stream, comprising: in a first process step, feeding the $CO_2$-containing gas stream to at least one rotating packed bed (RPB) absorber and feeding a $CO_2$ capture solvent to the same RPB absorber, wherein the solvent reacts with the $CO_2$ in a counter-current, cross-current, or co-current flow; in a second process step, thermally regenerating $CO_2$-loaded solvent resulting from the first process step in at least one RPB stripper equipped with heat input to remove $CO_2$ from the $CO_2$-loaded solvent to produce a regenerated ($CO_2$-reduced) solvent for re-circulation to the RPB absorber in the $CO_2$ capture process. Optionally, in the first process step wherein the $CO_2$ containing gas stream can be fed to at least one RPB absorber, two, three, four, five, six, or more RPB absorbers can be provided, preferably arranged in series on a common shaft. Further, optionally, in the second process step wherein the $CO_2$-loaded solvent can be thermally regenerated in at least one RPB stripper, two, three, four, five, six, or more RPB strippers can be provided, preferably arranged in series on a common shaft.

In another aspect, the disclosure relates to a process for capture of $CO_2$ from $CO_2$-containing gas, comprising contacting the $CO_2$-containing gas with an aqueous solvent composition according to the present disclosure, to produce a $CO_2$-reduced gas, and aqueous solvent composition into which $CO_2$ has been absorptively removed from the $CO_2$-containing gas. The process further advantageously comprises regenerating the aqueous solvent composition into which $CO_2$ has been absorptively removed from the $CO_2$-containing gas, to remove $CO_2$ therefrom to produce a regenerated aqueous solvent composition, and such regenerated aqueous solvent composition may be recycled to the contacting operation.

In various embodiments, the process for capture of $CO_2$ from $CO_2$-containing gas by contacting it with an aqueous $CO_2$-sorptive solvent composition of the present disclosure, as variously described herein, may further comprise regenerating the resulting $CO_2$-enriched aqueous solvent composition, wherein the regenerating comprises: heating the $CO_2$-enriched aqueous solvent composition to desorb $CO_2$ therefrom, to form a regenerated $CO_2$-reduced aqueous solvent composition and desorbed $CO_2$-containing gas; recovering the desorbed $CO_2$-containing gas; and recycling the regenerated $CO_2$-reduced aqueous solvent composition to the contacting. In various embodiments, the $CO_2$-enriched aqueous solvent composition is heated in the regenerating to temperature in a range of from 80° C. to 150° C. The recovered desorbed $CO_2$-containing gas comprises water vapor, and such gas may be purified to remove water and impurities therefrom, to produce a purified $CO_2$ gas, e.g., with a purity (mole percent) of at least 95%, 98%, 99%, 99.5%, or higher. The purified $CO_2$ gas may then be sequestered in a sequestration locus (e.g., a sequestration well) or be employed for enhancing hydrocarbon recovery in a hydrocarbon extraction operation (e.g., for enhanced oil recovery).

The process may be controllably operated by any suitable process controllers, to modulate temperatures, pressures, flowrates, and compositions as necessary or desirable to achieve specific levels of $CO_2$ capture, such as for example capture levels of at least 90%, 95%, 97%, 98% or higher levels by volume of the $CO_2$ in the $CO_2$-containing gas that is treated in the process. Further, the process may be carried out, in which the aqueous solvent composition into which $CO_2$ has been absorptively removed from the $CO_2$-containing gas is processed to recover $CO_2$ therefrom at purity of at least 95% by volume.

As previously discussed, the CO₂-containing gas that is treated for CO₂ capture using the compositions, systems, and processes of the present disclosure may be of any suitable character and generation source. For example, the CO₂-containing gas may be supplied from a combustion process, may comprise effluent from an electrical power-generating plant, may comprise syngas, may comprise blast furnace exhaust gas from steelmaking, may comprise cement kiln exhaust gas, may comprise aluminum smelting off gas, may comprise natural gas combined cycle (NGCC) powerplant flue gas, or may alternatively derive from any environments, natural or industrial processes, or sources.

It will therefore be recognized that the $CO_2$-sorptive aqueous solvent composition of the present disclosure may be variously formulated for capture of $CO_2$ from any of a wide variety of $CO_2$-containing gases when in contact therewith. The composition may for example comprise an amino acid salt, a tertiary or sterically hindered amine, and taurine or other suitable promoter.

The $CO_2$-sorptive aqueous solvent compositions of the present disclosure enable highly effective capture of $CO_2$ from $CO_2$-containing gas contacted therewith, producing $CO_2$-enriched aqueous solvent composition and $CO_2$-reduced gas. Such $CO_2$-enriched aqueous solvent composition is readily regenerated, e.g., at temperature in a range of from 80° C. to 150° C., for recovery of $CO_2$ therefrom for subsequent use, $CO_2$ sequestration, or other disposition. The regenerated solvent composition can be recirculated to the $CO_2$-containing gas contacting, for continuous $CO_2$ capture operation, or the $CO_2$ capture process may alternatively be carried out in a batch or semi-batch processing mode, as necessary or desired in specific applications.

The advantages and features of the disclosure are further illustrated with reference to the following examples, which are not to be construed as in any way limiting the scope of the disclosure but rather as illustrative of various embodiments in specific applications thereof.

EXAMPLES

The $CO_2$ capture performance and properties of different aqueous solvent compositions of the present disclosure (variously referred to hereinafter as Sustenol formulations or Sustenol solutions) for use in carbon capture processes were tested in the laboratory. In these tests, various Sustenol solutions were prepared to a desired composition by mixing predetermined mass of the amine/amines with promoters and with deionized water. The amine/amines comprised one or more of the following compounds: methyldiethanolamine (MDEA); potassium lysinate (KLyS); monoethanolamine (MEA); diethanolamine (DEA); aminomethylpropanol (AMP); piperazine (PZ); benzylamine (BZA); other primary, secondary and tertiary amines, amino acids, amino acid salts, and cyclic amines; and one or more promoter(s).

The compositions of the Sustenol solvents used in the tests are shown in Table 2:

TABLE 2

| Sustenol Formulation | MDEA % | KLyS % | AMP % | PZ % | BZA % | MEA % | DEA % | H2O % | Promoter Chemical | Promoter % |
|---|---|---|---|---|---|---|---|---|---|---|
| Baseline | | | | | | 30.0% | | 70.0% | Varies | Varies |
| Sustenol-1 | 21.0% | 22.0% | 5.0% | 5.0% | | | | 47.0% | Varies | Varies |
| Base Sustenol | 22.0% | 18.0% | | | | | | 60.0% | Varies | Varies |
| Sustenol-2 | 16.9% | 13.9% | 5.0% | 5.0% | 5.0% | 5.0% | | 48.2% | Taurine | 1.00% |
| Sustenol-3 | 16.9% | 13.9% | 3.9% | 3.9% | 5.0% | | | 53.4% | Taurine | 3.00% |
| Sustenol-4 | 15.0% | 16.0% | | 3.0% | 8.0% | 8.0% | | 49.0% | Taurine | 1.00% |
| Sustenol-5 | 15.0% | 16.0% | | 2.5% | 10.5% | | | 54.0% | Taurine | 2.00% |
| Sustenol-6 | 20.0% | 14.0% | 5.0% | 5.0% | 5.0% | | | 48.0% | Taurine | 3.00% |
| Sustenol-7 | 15.0% | 16.0% | | 3.0% | 8.0% | | 8.0% | 49.0% | Taurine | 1.00% |
| Sustenol-8 | 16.9% | 13.9% | 3.9% | 3.9% | 5.0% | | | 53.5% | Taurine | 3.00% |
| Sustenol-9 | 15.0% | 16.0% | | 2.5% | 10.5% | | | 54.0% | Taurine | 2.00% |
| Sustenol-10 | 15.0% | 16.0% | | 5.0% | 12.0% | | | 50.0% | Taurine | 2.00% |
| Sustenol-11 | 15.0% | 16.0% | | 3.0% | 8.0% | 8.0% | | 49.0% | Taurine | 1.00% |

Example 1

22.0 wt % KLyS, 21.0 wt % MDEA, 5.0 wt % AMP, 5.0 wt % PZ, and 47.0 wt % H₂O were mixed thoroughly to form a homogeneous solution. This solution was denoted Sustenol-1.

Tests were performed with a feed gas containing 4% $CO_2$ and 96% $N_2$. The test conditions were as follows:
  adsorption conditions: 4% $CO_2$, 96% $N_2$, 300 mL per minute, 40° C.

FIG. 1 is a graph of $CO_2$ breakthrough apparatus used for solvent breakthrough testing. The feed gas was fed into the bottom of a sealed vessel containing 250 mL of the solvent to be tested. A stirring bar at the bottom of the vessel stirred the solvent at 300 RPM. The gas exiting the vessel was continuously monitored for $CO_2$ concentration with an infrared $CO_2$ analyzer and the concentration was recorded as a function of time.

Figure 2:
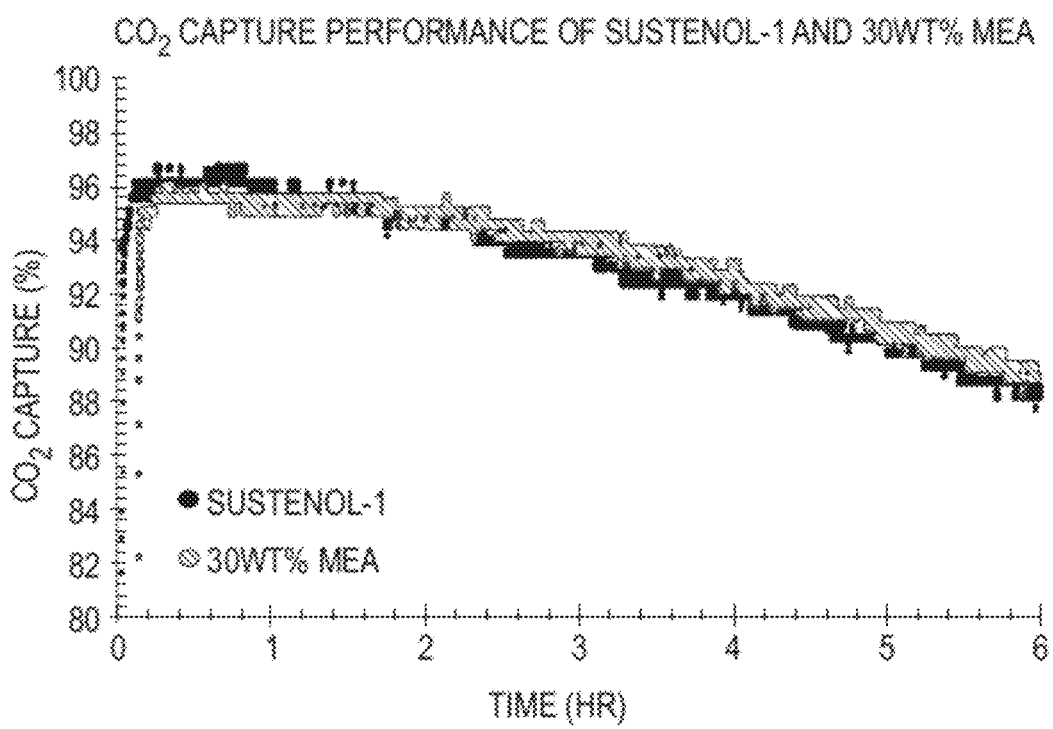
FIG. 2 is a graph of $CO_2$ capture performance comparison between Sustenol-1 and 30 wt % MEA.

Empirical results of the testing are shown in FIG. 2. FIG. 2 is a graph of $CO_2$ capture performance comparison between Sustenol-1 and 30 wt % MEA. FIG. 2 shows that Sustenol-1 has identical or slightly better $CO_2$ capture rate and capacity as compared to those of 30 wt % MEA, which is considered to have the fastest $CO_2$ reaction rate because MEA is a primary amine. Considering that the Sustenol-1 solvent has superior characteristics in thermal and oxidative stability, in solvent regeneration energy, in emissions and in toxicity, in comparison with MEA, the Sustenol-1 solvent was correspondingly demonstrated to be a markedly superior solvent for $CO_2$ capture as compared to 30 wt % MEA.

Example 2

Sustenol-1 solvent and Sustenol-1 solvent with an additional 3,000 ppmw of lysine as promoter were tested with 4 vol % $CO_2$ in nitrogen ($N_2$) at 30° C. using the $CO_2$ breakthrough test apparatus as shown in FIG. 1 Test results are set out in Table 2 below and show that lysine increased both the maximum and the average rate of reaction/absorption of $CO_2$.

TABLE 3

Comparison of $CO_2$ Capture Performance of Sustenol-1, and Sustenol-1 with 3,000 ppmw Lysine as promoter.

| Performance Parameters | Sustenol-1 | Sustenol-1 with 3,000 ppmw lysine |
|---|---|---|
| $CO_2$ Loading (molCO$_2$/mol$_{amine}$) | 0.490 | 0.490 |
| Maximum Capture | 99% | 99% |
| Maximum $CO_2$ (wt. %) in Solution | 9.06 | 9.21 |
| Maximum Rate (mol/kg/s) × 10⁵ | 40.67 | 45.30 |
| Average Rate (>90% Capture, mol/kg/s × 10⁵) | 40.29 | 43.80 |

Example 3

To further determine the effectiveness of lysine as a promoter, 3,000 ppm of lysine were added to 30 wt % MEA. Lysine-promoted and unpromoted 30 wt % MEA were tested with 4 vol % $CO_2$ in nitrogen ($N_2$) at 30° C. using the $CO_2$ breakthrough test apparatus shown in FIG. 1.

Figure 3:
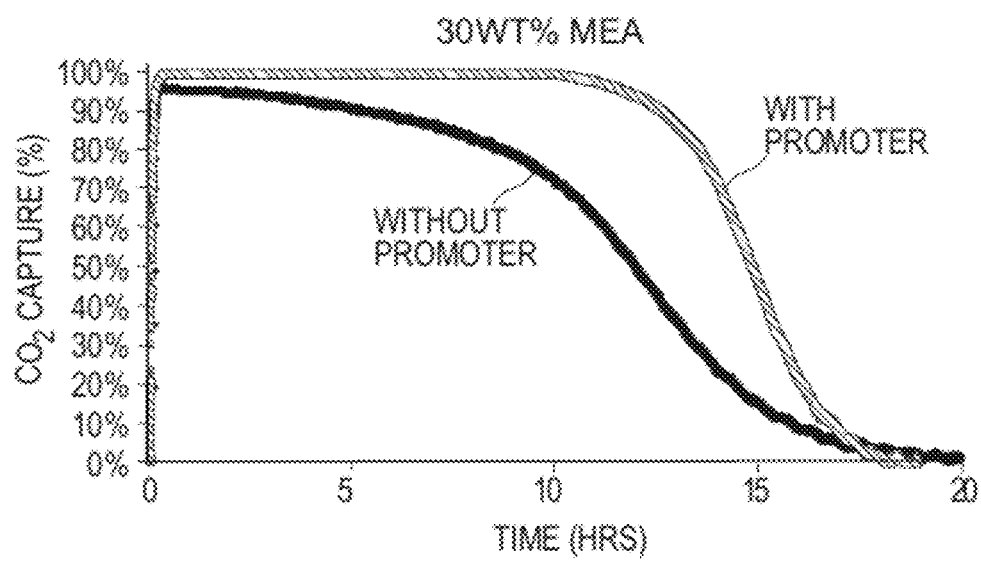
FIG. 3 is a graph of $CO_2$ capture performance comparison between 30 wt % MEA with and without lysine as promoter.

Empirical results of the testing are shown in FIG. 3. FIG. 3 is a graph of $CO_2$ capture performance comparison between 30 wt % MEA with and without lysine as promoter. FIG. 3 shows that lysine is an effective promoter for 30 wt % MEA.

Example 4

To further determine the effectiveness of lysine as a promoter, 2 wt % lysine and 45 wt % MDEA were dissolved in water and mixed to form a homogeneous solution. Lysine-promoted and unpromoted 45 wt % MDEA were tested with 4 vol % $CO_2$ in nitrogen ($N_2$) at 30° C. using the $CO_2$ breakthrough test apparatus as shown in FIG. 1.

Figure 4:
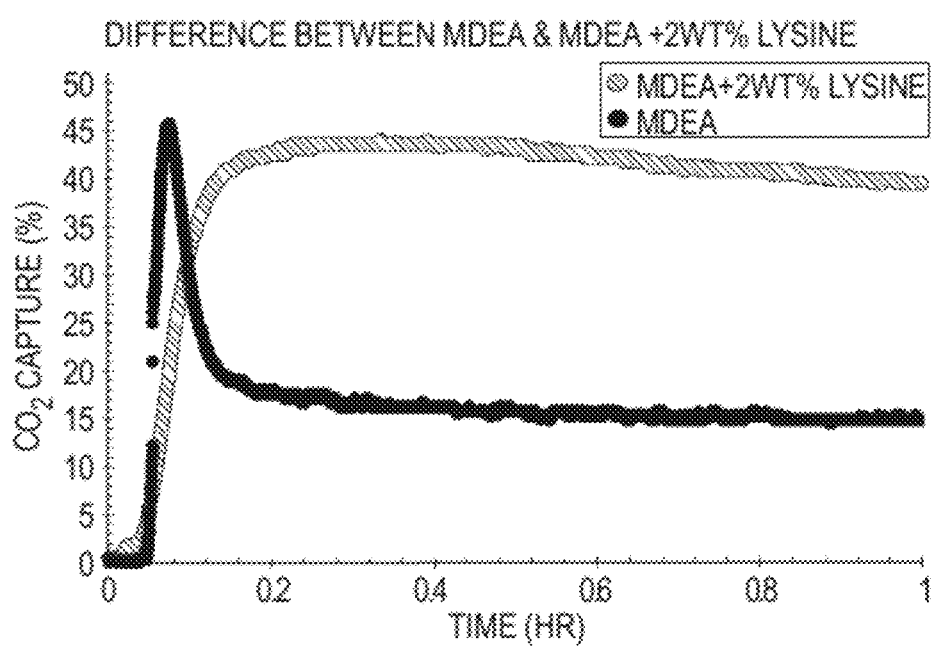
FIG. 4 is a graph of $CO_2$ breakthrough of a homogeneous solution composed of 45 wt % MDEA dissolved in water with and without the addition of 2 wt % lysine.

Test results are shown in Table 4. The data in this table show that the average rate of $CO_2$ absorption with MDEA increased by about 200% while the maximum rate stayed about the same. The results are also shown in FIG. 4, demonstrating that $CO_2$ breakthrough occurred much faster for MDEA without lysine as promoter, indicating lower capacity and lower rate of absorption when MDEA without lysine was used.

TABLE 4

Comparison of $CO_2$ Capture Performance of MDEA with MDEA + 2 wt % Lysine as Promoter.

| Parameters | MDEA + 2 wt. % LyS | MDEA | % Increase |
|---|---|---|---|
| $CO_2$ Loading (molCO$_2$/mol$_{amine}$) | 0.105 | 0.061 | 73% |
| Maximum Capture (%) | 44% | 45% | −2% |
| Maximum $CO_2$ (wt. %) in Solution | 2.09 | 1.20 | 74% |
| Maximum Rate (mol/kg/s) '10⁶ | 18.99 | 19.24 | −1% |
| Average Rate (>90% Cap, mol/kg/s '10⁶) | 18.29 | 6.1 | 199% |

Example 5

Varying amount of lysine was added to Sustenol-1 and the resulting solutions were tested with 4 vol % $CO_2$ in nitrogen ($N_2$) at 30° C. using the $CO_2$ breakthrough test apparatus shown in FIG. 1. The rates of $CO_2$ absorption in the solvent solution were estimated from the breakthrough tests and are shown in Table 5.

TABLE 5

Comparison of $CO_2$ Rate of Absorption of Sustenol-1 with Varying Amounts of Lysine as Promoter.

| Amount of Lysine in Sustenol-1 | Max. Rate (mol/kg/s)*10⁵ | Avg. Rate (>90% Cap, mol/kg/s*10⁵) |
|---|---|---|
| Lysine (0 ppm) | 41.80 | 41.02 |
| Lysine (600 ppm) | 41.99 | 41.34 |
| Lysine (3000 ppm) | 44.47 | 43.19 |
| Lysine (3000 ppm) | 43.27 | 42.52 |

Example 6

Various amino acids were tested as promoters for Sustenol-1 and 30 wt % MEA. The amino acid promoted solvents were tested with 4 vol % $CO_2$ in nitrogen ($N_2$) at 30° C. using the $CO_2$ breakthrough test apparatus shown in FIG. 1. The rates of $CO_2$ absorption of the solutions were estimated from the breakthrough tests and are shown in Table 5. The results in this table demonstrate that the amino acids effectively enhanced $CO_2$ absorption rates. The most effective promoters were glutamine, lysine, arginine, taurine, and tyrosine. The others were less effective but still improved the rate of $CO_2$ absorption.

TABLE 6

Comparison of $CO_2$ Rate of Absorption of Sustenol-1 and 30 wt % MEA with Various Amino Acids as Promoters.

| Amino Acid Promoters | Conc. (ppmw) | Max. Rate (mol/kg/s)*$10^5$ | Avg. Rate (mol/kg/s)*$10^5$ (>90% Capture) |
|---|---|---|---|
| Glutamine | 3,000 | 45.3 | 43.8 |
| 30 wt % MEA with Lysine | 3,000 | 44.46 | 43.53 |
| Sustenol-1 with Lysine | 3,000 | 44.47 | 43.19 |
| Sustenol-1 with Lysine | 3,000 | 43.27 | 42.52 |
| Sustenol-1 with Arginine | 3,000 | 43.5 | 42.97 |
| Sustenol-1 with Taurine | 3,000 | 42.87 | 42.47 |
| Sustenol-1 with Tyrosine | 3,000 | 43.47 | 42.46 |
| Sustenol-1 with Citrulline | 3,000 | 43.59 | 42.23 |
| Sustenol-1 with Glutamic acid | 3,000 | 42.92 | 42.19 |
| Sustenol-1 with Asparagine | 3,000 | 42.85 | 42.12 |
| Sustenol-1 with Alanine | 3,000 | 43.02 | 41.96 |
| Sustenol-1 with Proline | 3,000 | 42.87 | 41.86 |
| Sustenol-1 with Sarcosine | 3,000 | 42.43 | 41.86 |
| Sustenol-1 with Glycine | 3,000 | 42.06 | 41.47 |
| Sustenol-1 with Lysine | 600 | 41.99 | 41.34 |
| Sustenol-1 with Aspartic Acid | 3,000 | 42.11 | 41.27 |
| Sustenol-1 with Histidine | 3,000 | 42.64 | 40.89 |
| Sustenol-1 (without promoter) | 0 | 41.8 | 41.02 |
| 30 wt % MEA | 0 | 41.09 | 40.65 |

Example 7

Figure 5:
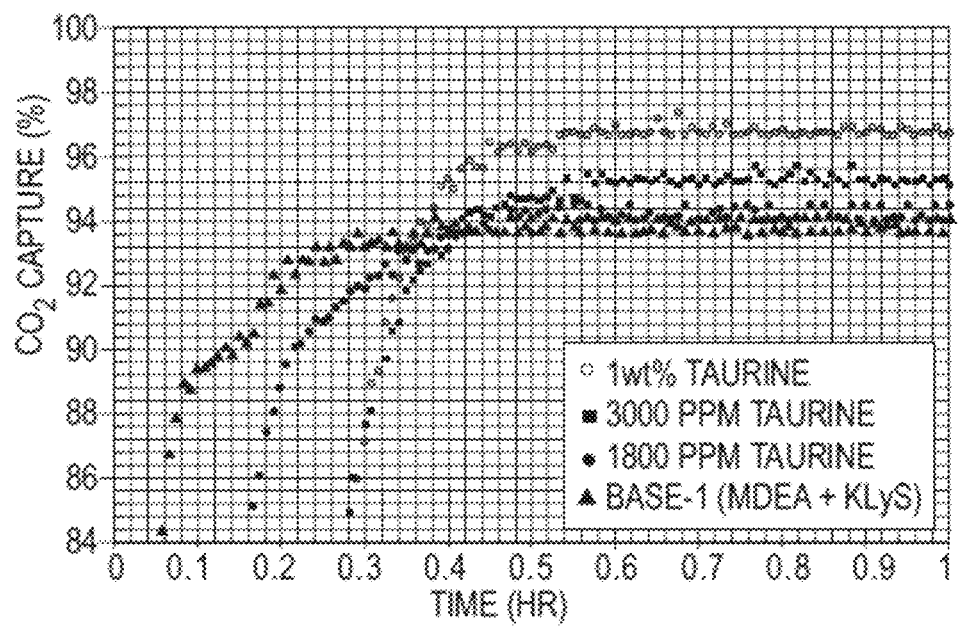
FIG. 5 is a graph of $CO_2$ capture performance comparison between base solvents with different taurine concentrations.

A base Sustenol solvent was made with 22 wt % MDEA and 18 wt % KLyS and 60 wt % water. Taurine was used as promoter in varying concentrations from 0 to 1.0 wt % in the base solvent. The taurine promoted solvents were tested with 4 vol % $CO_2$ in nitrogen ($N_2$) at 30° C. using the $CO_2$ breakthrough test apparatus shown in FIG. 1. Empirical results of the tests are shown in FIG. 5. FIG. 5 is a graph of $CO_2$ capture performance comparison between base solvents with different taurine concentrations. FIG. 5 shows that higher $CO_2$ capture capacity was obtained with increasing taurine concentration, demonstrating the effectiveness of taurine as a promoter.

Example 8

Figure 6:
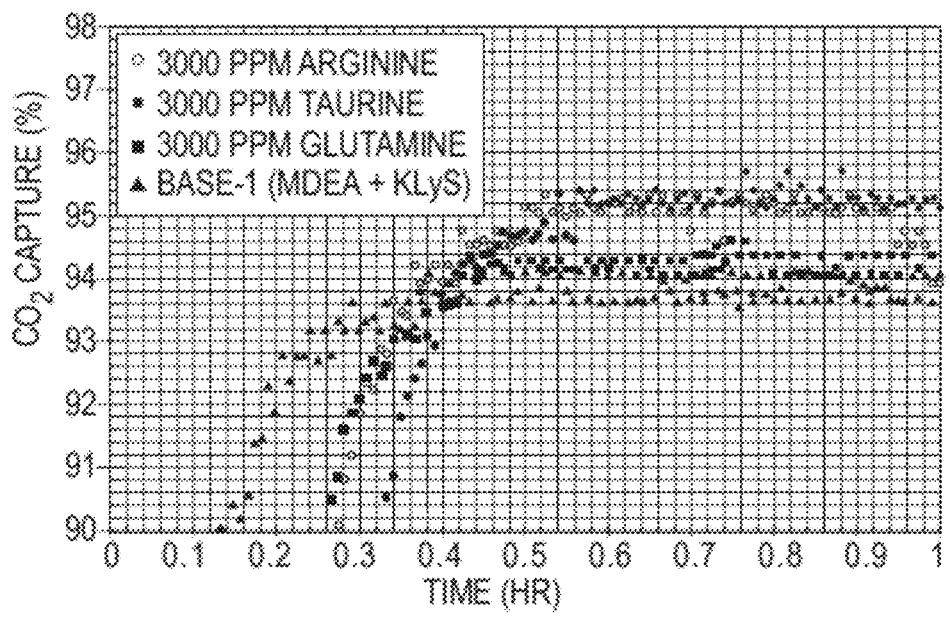
FIG. 6 is a graph of $CO_2$ capture performance comparison between base solvents with different promoters.

A base Sustenol solvent was made with 22 wt % MDEA and 18 wt % KLyS and 60 wt % water. Taurine, arginine, and glutamine were used as promoters at 3,000 ppm concentrations in the base solvent. The promoted solvents were tested with 4 vol % $CO_2$ in nitrogen ($N_2$) at 30° C. using the $CO_2$ breakthrough test apparatus shown in FIG. 1. Empirical results of the tests are shown in FIG. 6. FIG. 6 is a graph of $CO_2$ capture performance comparison between base solvents with different promoters. FIG. 6 shows that higher $CO_2$ capture capacity was obtained with taurine and arginine as promoters. Glutamine was less effective.

Example 9

Figure 7:
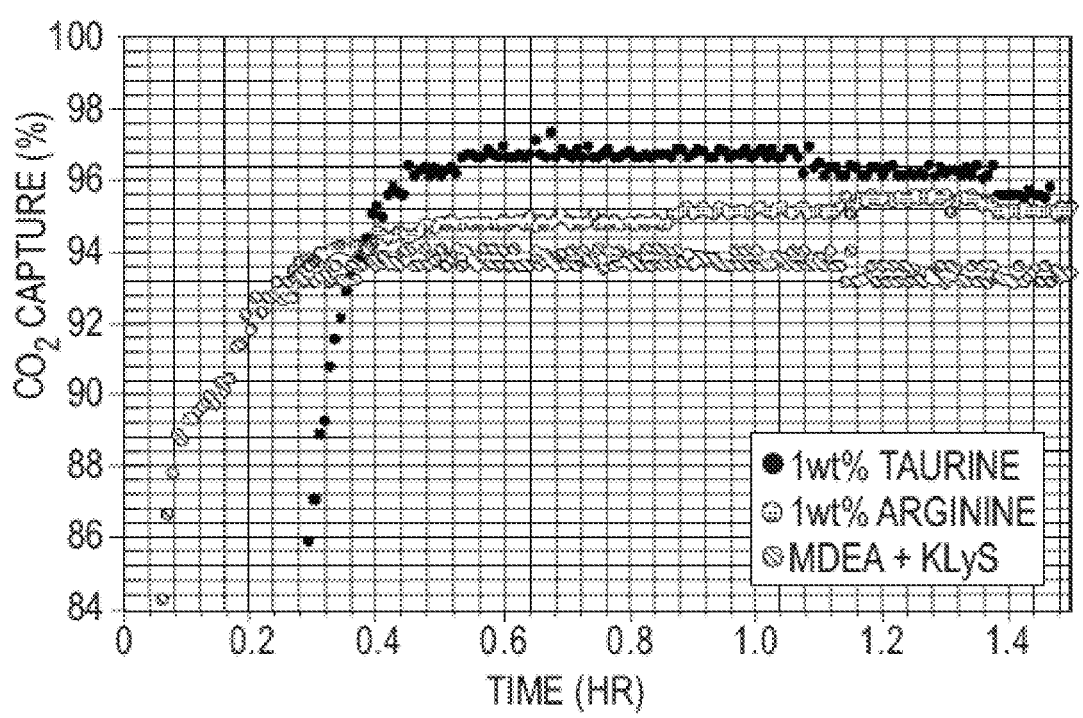
FIG. 7 is a graph of $CO_2$ capture performance comparison between base solvents with the two promoters.

A base Sustenol solvent was made with 22 wt % MDEA and 18 wt % KLyS and 60 wt % water. Taurine and arginine were used as promoters at 1.0 wt % concentration in the base solvent. The promoted solvents were tested with 4 vol % $CO_2$ in nitrogen ($N_2$) at 30° C. using the $CO_2$ breakthrough test apparatus shown in FIG. 1. Empirical results of the tests are shown in FIG. 7. FIG. 7 is a graph of $CO_2$ capture performance comparison between base solvents with the two promoters. FIG. 7 shows that higher $CO_2$ capture capacity was obtained with taurine than with arginine as a promoter, indicating that taurine is a more effective promoter for the base solvent.

Example 10

Figure 9:
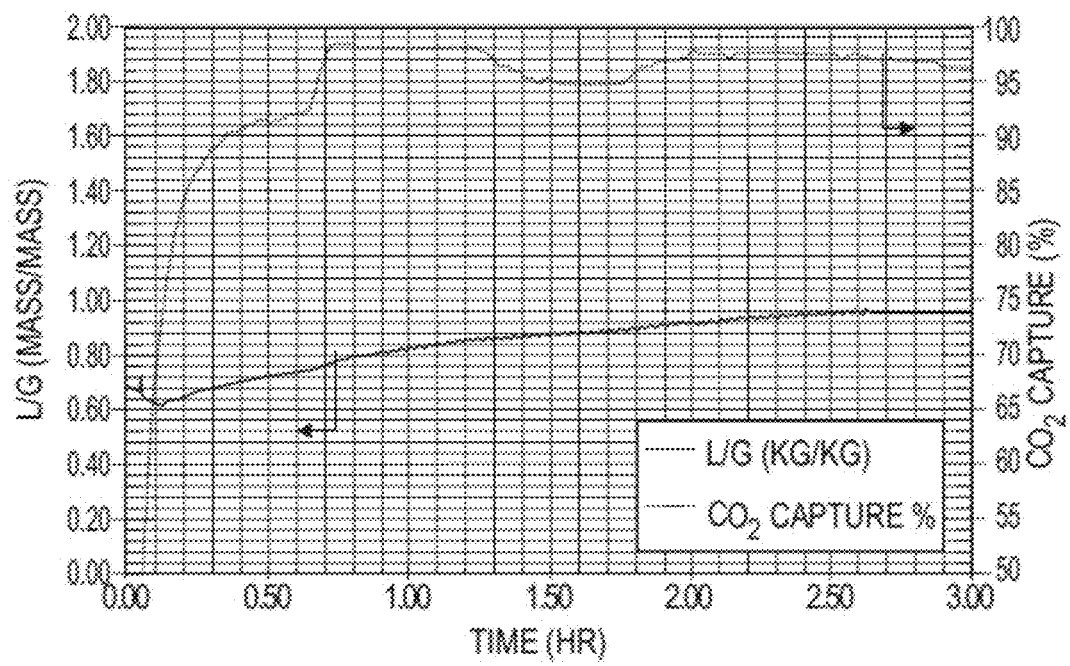
FIG. 9 shows percent $CO_2$ capture and liquid/gas flow ratio (L/G) by mass for Sustenol-3, as a function of time on stream.
Figure 10:
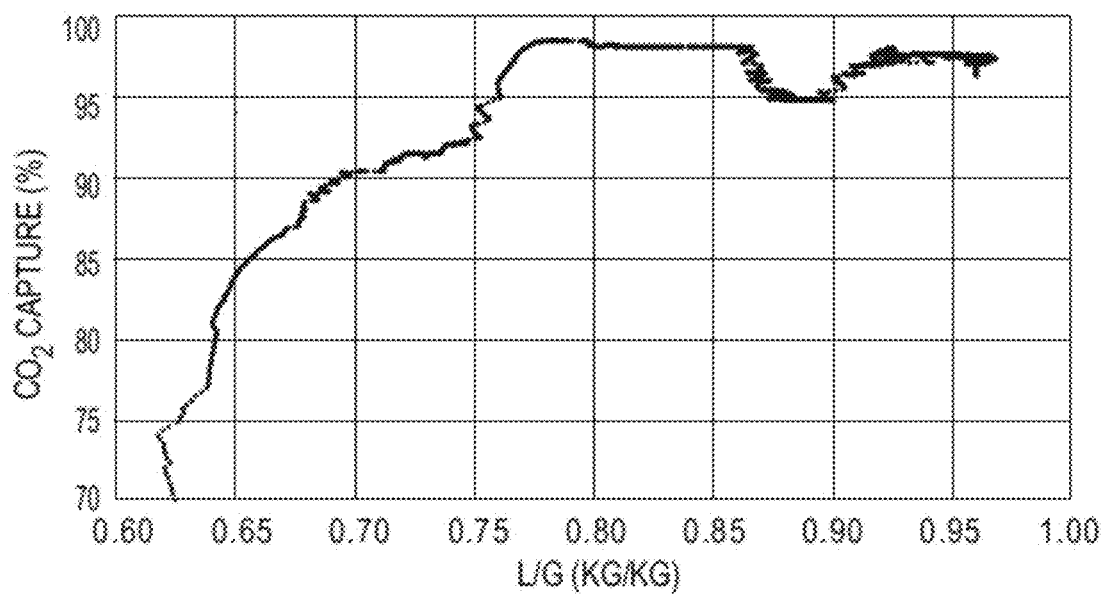
FIG. 10 shows percent $CO_2$ capture vs. L/G ratio for the data shown in FIG. 9.

53.4 wt % water, 16.9 wt % MDEA, 3.9 wt % AMP, 3.9 wt % PZ, 13.9 wt %, KLyS, 5.0 wt % BZA, and 3 wt % taurine as promoter were mixed to make a homogeneous solution denoted as Sustenol-3. Sustenol-3 and MEA were tested using the absorption apparatus shown in FIG. 8. This apparatus has an absorber column with an internal diameter (ID) of 1.5 inch or 3.8 cm, packed with random stainless steel foil packing with a packing height of 47 inch or 120 cm. The tests were conducted with 22 liter (STP)/min of air flow mixed with 1.0 liter (STP)/min of $CO_2$ to make a 4.3 vol % $CO_2$ in air inlet gas stream simulating NGCC flue gas. The lean Sustenol-3 or MEA was heated to an inlet temperature of 40° C. at the top of the absorber column. The gas inlet pressure was about 2.0 psig. Percent $CO_2$ capture and liquid/gas flow ratio (L/G) by mass for Sustenol-3 are shown in FIG. 9 as a function of time on stream. FIG. 9 shows that steady state was reached at about 1 hour into the run with an L/G of about 0.9 and percent $CO_2$ capture was 98%. The same data are shown differently in FIG. 10 as percent $CO_2$ capture vs. L/G ratio. FIG. 10 shows that percent $CO_2$ capture was greater than 95% when L/G ratio was greater than 0.76.

Figure 8:
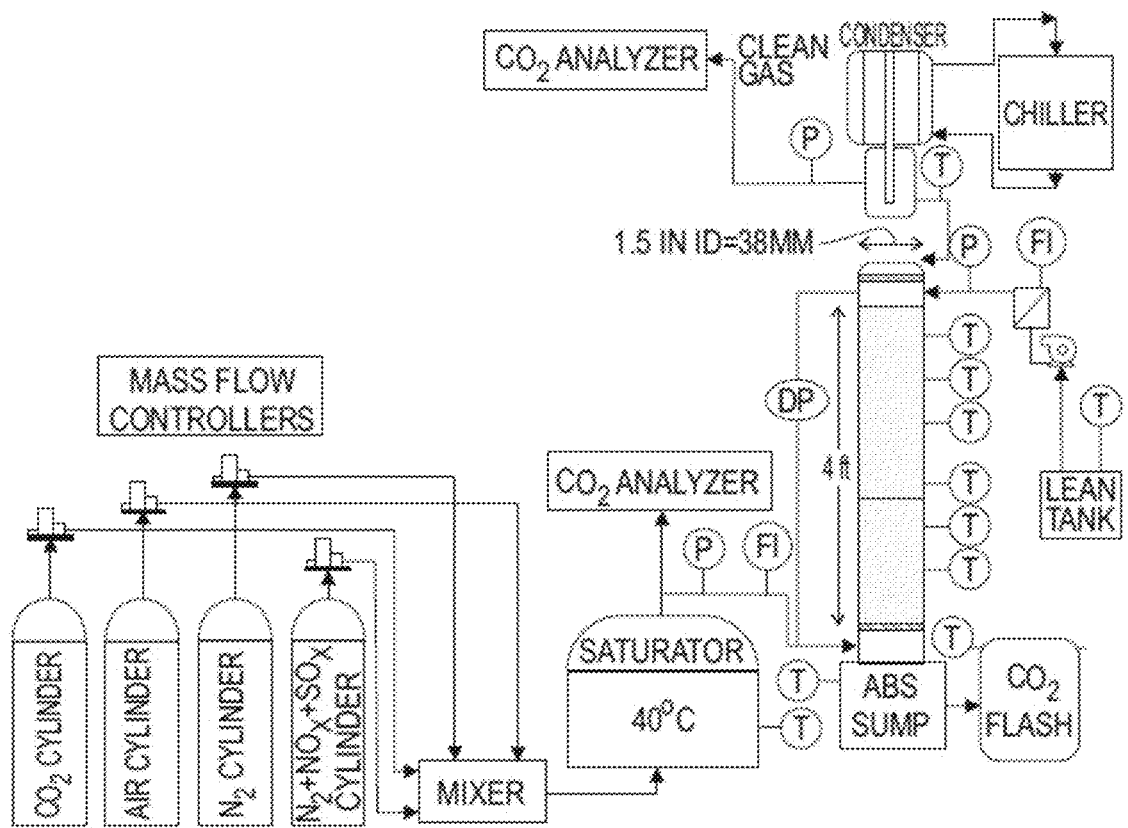
FIG. 8 is a schematic illustration of an apparatus utilized for testing absorption performance of solvents.
Figure 11:
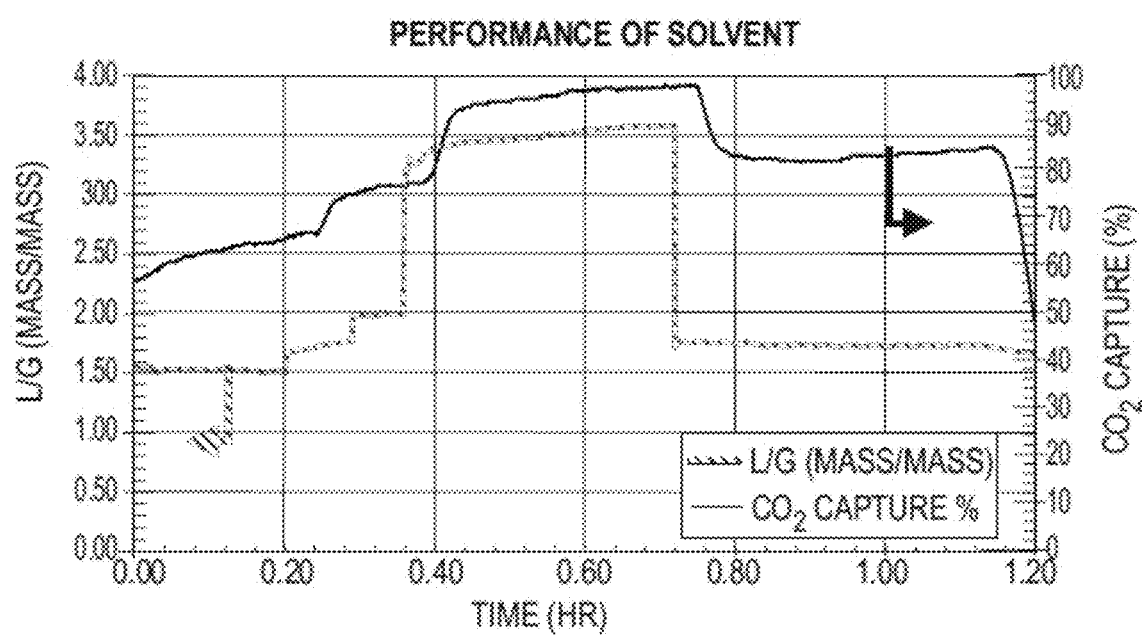
FIG. 11 shows percent $CO_2$ capture and liquid/gas flow ratio (L/G) by mass for 30 wt % MEA (lean loading=0.15 $molCO_2/mol_{amine}$), as a function of time on stream.

30 wt % MEA was tested as a reference using the same conditions as those used in the Sustenol-3 test using the same apparatus shown in FIG. 8. Percent $CO_2$ capture and liquid/gas flow ratio (L/G) by mass for 30 wt % MEA are shown in FIG. 11 as a function of time on stream. FIG. 11 shows that at steady state with an L/G of about 1.7, percent $CO_2$ capture was at about 83%.

The rich solvent $CO_2$ loadings for Sustenol-3 and 30 wt % MEA are shown in Table 7. Table 7 shows that Sustenol-3 has a much higher rich solvent $CO_2$ loading and two times cyclic $CO_2$ working capacity than that of 30 wt % MEA. Sustenol-3 also captures higher amount (98%) of $CO_2$ than that of 30 wt % MEA (83%) at the same L/G.

TABLE 7

Comparison of Rich Solvent $CO_2$ Loading and Percent $CO_2$ capture.

| Solvent | Lean $CO_2$ loading ($mol_{CO2}$/ $mol_{alka}$) | Rich $CO_2$ loading ($mol_{CO2}$/ $mol_{alka}$) | Cyclic $CO_2$ working capacity ($mol_{CO2}$/$mol_{alka}$) | $CO_2$ Capture (%) |
|---|---|---|---|---|
| 30 wt % MEA | 0.15 | 0.33 | 0.18 | 83% (L/G = 1.7) |
| Sustenol-3 | 0.12 | 0.48 | 0.36 | 98% (L/G = 1.7) |

Example 11

Figure 12:
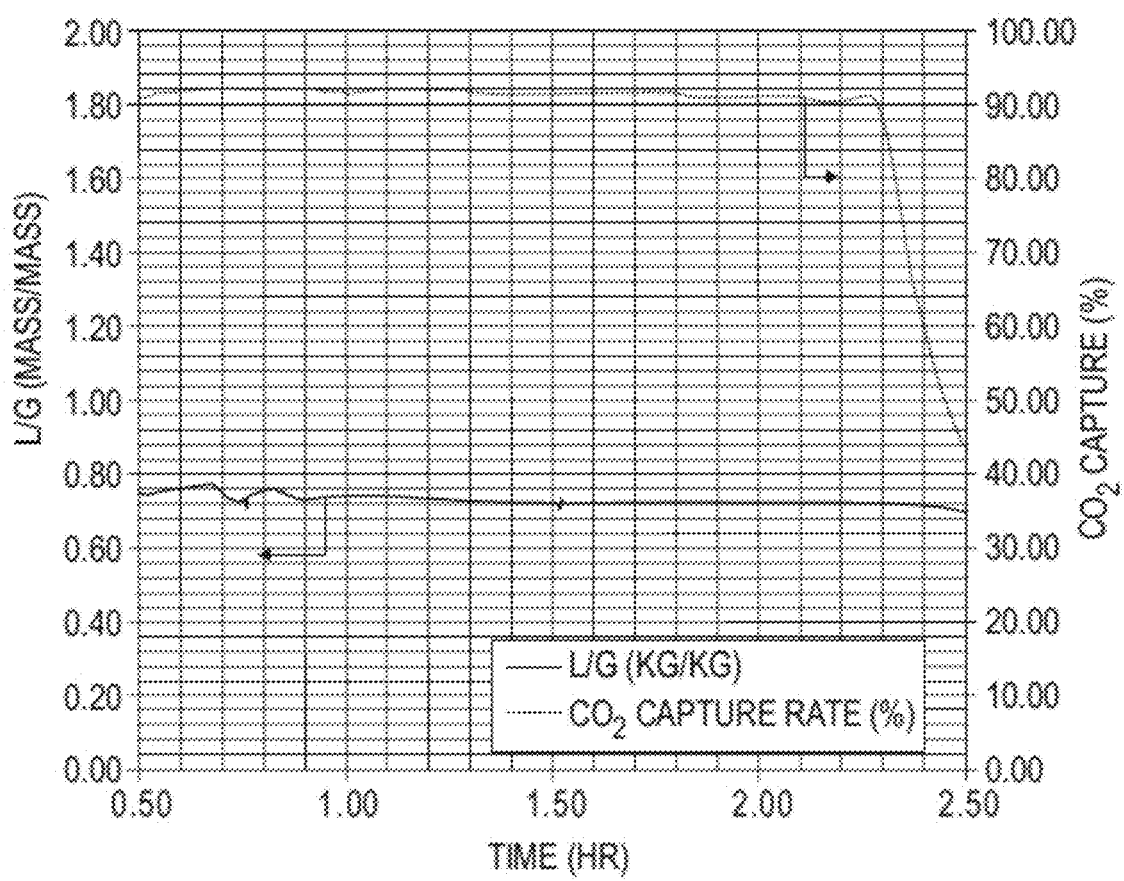
FIG. 12 shows percent $CO_2$ capture and liquid/gas flow ratio (L/G) by mass for Sustenol-2, as a function of time on stream.

48.2 wt % water, 16.9 wt % MDEA, 5.0 wt % AMP, 5.0 wt % PZ, 13.9 wt %, KLyS, 5.0 wt % BZA, 5 wt % MEA, and 1 wt % taurine as promoter were mixed to make a homogeneous solution denoted as Sustenol-2. Sustenol-2 was tested using the absorption apparatus shown in FIG. 8. The tests were conducted with 44.5 liter (STP)/min of air flow mixed with 2.0 liter (STP)/min of $CO_2$ to make a 4.3 vol % $CO_2$ in air as the inlet gas stream simulating NGCC flue gas. The lean Sustenol-2 was heated to an inlet temperature of 40° C. at the top of the absorber column. The gas inlet pressure was about 2.0 psig. Percent $CO_2$ capture and liquid/gas flow ratio (L/G) by mass for Sustenol-2 are shown in FIG. 12 as a function of time on stream. FIG. 12 shows that steady state was reached at about 30 minutes into the run with an L/G of about 0.7 and percent $CO_2$ capture of 92%. As compared with the $CO_2$ capture performance of MEA shown in Table 7, Sustenol-2 was a far better solvent than 30 wt % MEA which only achieved 83% $CO_2$ capture at an L/G of 1.7.

Example 12

Figure 13:
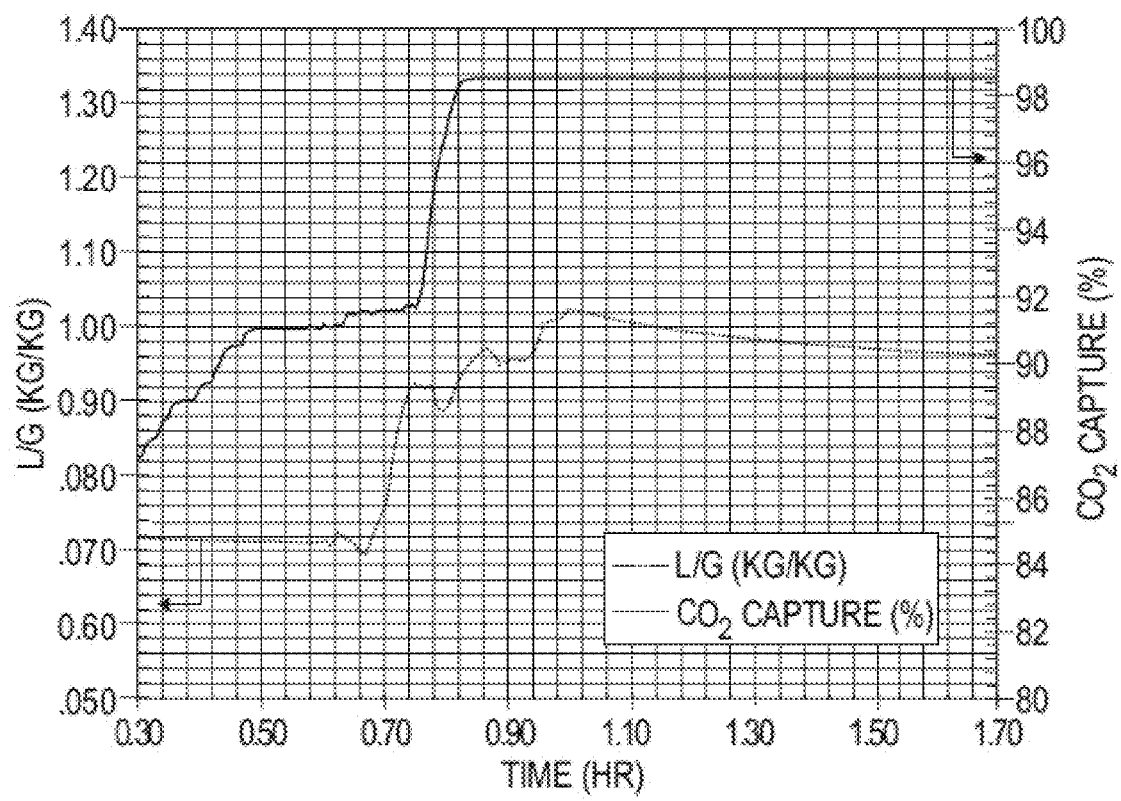
FIG. 13 shows percent $CO_2$ capture and liquid/gas flow ratio (L/G) by mass for Sustenol-4, as a function of time on stream.

49 wt % water, 15 wt % MDEA, 3 wt % PZ, 16 wt %, KLyS, 8 wt % BZA, 8 wt % MEA, and 1 wt % taurine as promoter were mixed to make a homogeneous solution denoted as Sustenol-4. Sustenol-4 was tested using the absorption apparatus shown in FIG. 8. The tests were conducted with 44.5 liter (STP)/min of air flow mixed with 2.0 liter (STP)/min of $CO_2$ to make a 4.3 vol % $CO_2$ in air as the inlet gas stream simulating NGCC flue gas. The lean Sustenol-4 was heated to an inlet temperature of 40° C. at the top of the absorber column. The gas inlet pressure is about 2.0 psig. Percent $CO_2$ capture and liquid/gas flow ratio (L/G) by mass for Sustenol-4 are shown in FIG. 13 as a function of time on stream. FIG. 13 shows that steady state was reached at about 30 minutes into the run with an L/G of about 0.7 for Sustenol-4 and percent $CO_2$ capture of 92%. When L/G was increased to 1.0, $CO_2$ capture reached 98.5%.

Example 13

Figure 14:
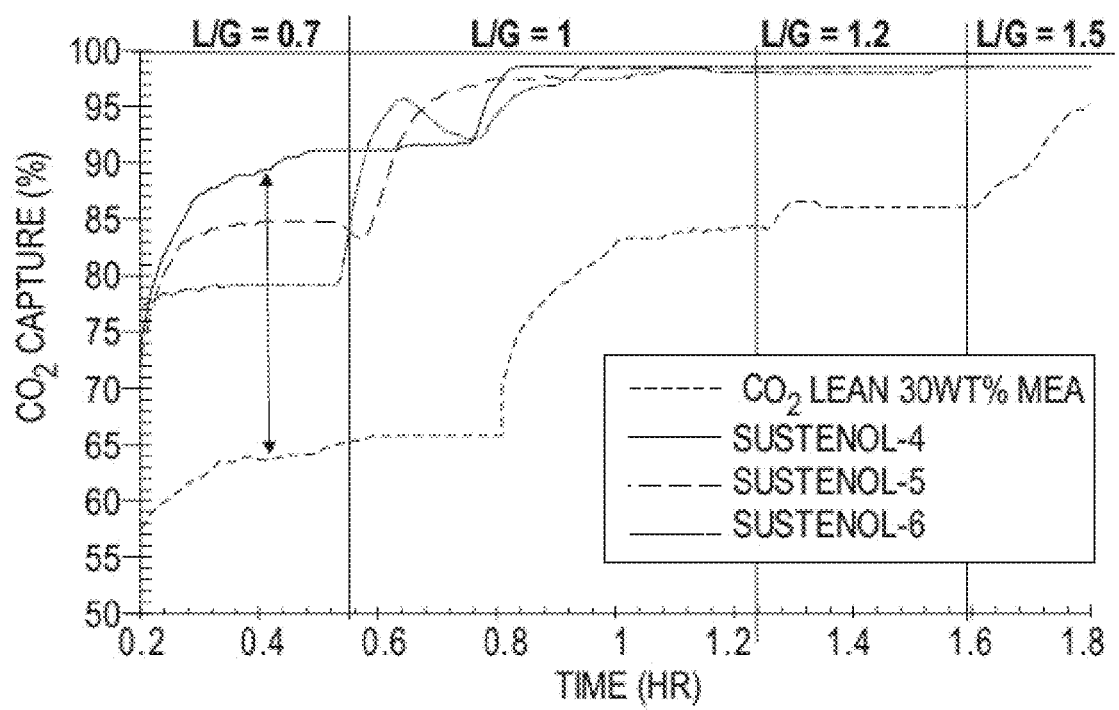
FIG. 14 shows percent $CO_2$ capture and liquid/gas flow ratio (L/G) by mass for 30 wt % MEA, Sustenol-4, Sustenol-5, and Sustenol-6 as a function of time on stream.

54 wt % water, 15 wt % MDEA, 2.5 wt % PZ, 16 wt %, KLyS, 10.5 wt % BZA, and 2 wt % taurine as promoter were mixed to make a homogeneous solution denoted as Sustenol-5. 48 wt % water, 20 wt % MDEA, 5 wt % PZ, 14 wt %, KLyS, 5 wt % MEA, 5 wt % BZA, and 3 wt % taurine as promoter were mixed to make a homogeneous solution denoted as Sustenol-6. Sustenol-5 and Sustenol-6 were tested using the absorption apparatus shown in FIG. 8. The tests were conducted with 44.5 liter (STP)/min of air flow mixed with 2.0 liter (STP)/min of $CO_2$ to make a 4.3 vol % $CO_2$ in air inlet gas stream simulating NGCC flue gas. Sustenol-5 and Sustenol-6 were tested separately using the same test conditions as those used in Example 12. Percent $CO_2$ capture for Sustenol-4, Sustenol-5, and Sustenol-6 are shown in FIG. 14 as a function of time on stream for four L/G ratios of 0.7, 1.0, and 1.2. FIG. 14 shows that at an L/G ratio of 0.7 Sustenol-4 has 91%, Sustenol-5 has 85%, and Sustenol-6 has 79% $CO_2$ capture efficiency, respectively. At an L/G ratio of 1 Sustenol-4, Sustenol-5, and Sustenol-6 demonstrate greater than 97% capture efficiency. At an L/G of 1.2, all three solvents reach 98% $CO_2$ capture efficiency.

Example 14

Figure 15:
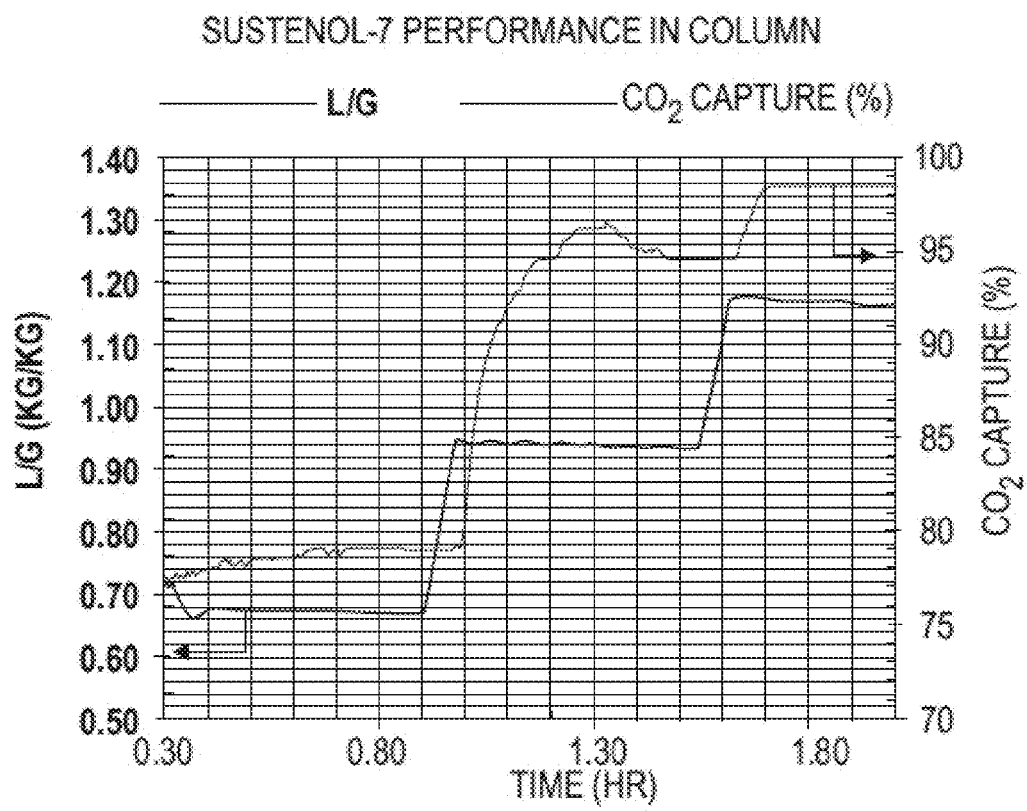
FIG. 15 shows percent $CO_2$ capture and liquid/gas flow ratio (L/G) by mass for Sustenol-7 as a function of time on stream.

49 wt % water, 15 wt % MDEA, 3 wt % PZ, 16 wt %, KLyS, 8 wt % DEA, 8 wt % BZA, and 1 wt % taurine as promoter were mixed to make a homogeneous solution denoted as Sustenol-7. Sustenol-7 was tested using the absorption apparatus shown in FIG. 8. The tests were conducted with 44.5 liter (STP)/min of air flow mixed with 2.0 liter (STP)/min of $CO_2$ to make a 4.3 vol % $CO_2$ in air inlet gas stream simulating NGCC flue gas. Percent $CO_2$ capture for Sustenol-7 is shown in FIG. 15 as a function of time on stream at three L/G ratios of 0.67, 0.93, and 1.17, respectively. At an L/G of 0.67, Sustenol-7 showed 79% $CO_2$ capture efficiency. At an L/G of 0.93, Sustenol-7 showed 95% $CO_2$ capture efficiency. $CO_2$ capture efficiency of Sustenol-7 was 98.5% at an L/G of 1.17.

Specific reboiler duty (SRD) is the amount of energy required to regenerate the solvent used for $CO_2$ capture from flue gas. SRD is composed of three main components: sensible heat, heat of absorption, and heat loss due to evaporation of water. SRD is one of the main factors that affect the energy penalty and cost of solvent-based $CO_2$ capture process. The SRDs of Sustenol solvent formulations disclosed in the above examples are summarized in Table 8. Table 8 shows that the SRDs of the Sustenol solvent formulations are at least 38.9% lower than that of 30 wt % MEA and 16.5% lower than that of Shell Cansolv® $CO_2$ capture solvent.

TABLE 8

SRDs (in GJ/ton $CO_2$) of Sustenol at 97% $CO_2$ capture from NGCC flue gas are compared with industrial reference solvents 30 wt % MEA and Shell Cansolv ® $CO_2$ capture solvent.

| Solvent | Reboiler Duty (GJ/ton $CO_2$) |
|---|---|
| Sustenol-3 | 2.37 |
| Sustenol-4 | 2.16 |
| Sustenol-5 | 2.23 |
| Sustenol-6 | 2.29 |
| 30 wt % MEA | 3.88 |
| Shell Cansolv ® $CO_2$ capture solvent | 2.84 |

The various Sustenol solvent formulations and their $CO_2$ capture efficiency, L/G ratio, lean and rich viscosities at 25° C., and heat capacity values are shown in Table 9.

TABLE 9

| Sustenol Formulation | L/G mass/ mass | CO$_2$ Capture (%) % | Lean Viscosity cP | Rich Viscosity cP | Heat Capacity k.J/kg/K |
|---|---|---|---|---|---|
| Baseline | 1.7 | 83% | 4 | 7.0 | 3.9 |
| Sustenol-1 | 1.0 | 70% | 7 | 12.0 | NA |
| Base Sustenol | | | Not Measured | | |
| Sustenol-2 | 1.0 | 92% | 10 | 29 | NA |
| Sustenol-3 | 1.0 | 82% | 8 | 20 | NA |
| Sustenol-4 | 1.0 | 99% | 9 | 19 | 3.3 |
| Sustenol-5 | 1.0 | 98% | 8 | 16 | 3.4 |
| Sustenol-6 | 1.0 | 85% | 10 | 22 | 3.1 |
| Sustenol-7 | 1.0 | 97% | 12 | 24 | 3.3 |
| Sustenol-8 | 1.0 | 90% | 8 | 20 | NA |
| Sustenol-9 | 0.8 | 70% | 8 | 16 | 3.2 |
| Sustenol-10 | 1.0 | 71% | 8 | 16 | 3.3 |
| Sustenol-11 | 1.0 | 99% | 10 | 21 | 3.3 |

Figure 16:
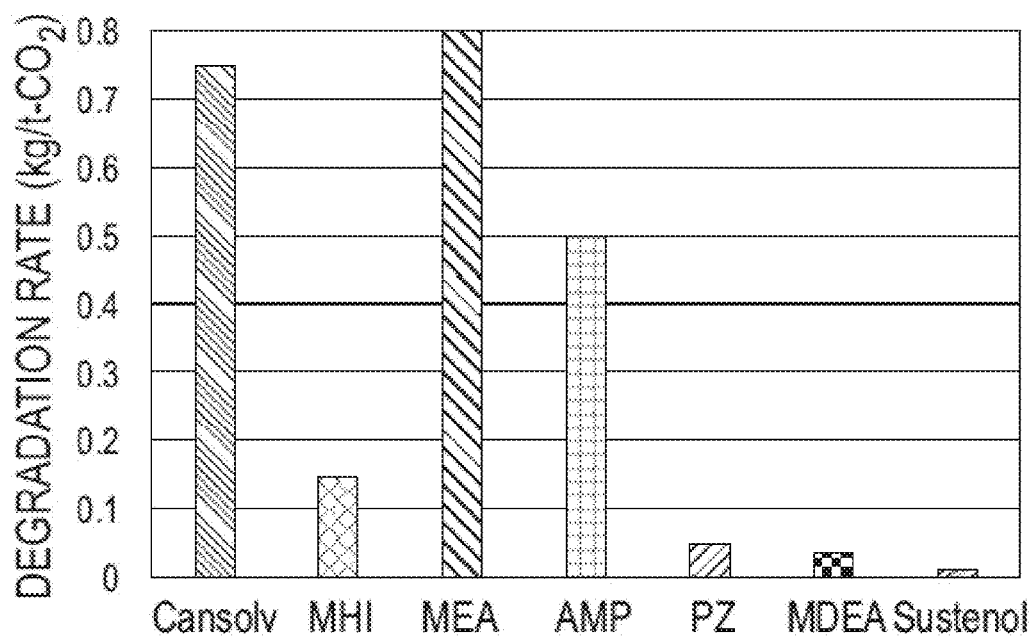
FIG. 16 is a bar graph of degradation rate (kg/t-$CO_2$) for Cansolv® aqueous amine $CO_2$ capture solvent (Shell plc, UK), MHI, MEA, AMP, PZ, MDEA, and Sustenol-11.

The thermal degradation rate of the Sustenol-11 solvent composition as calculated in accordance with Ramezani et al., State-of-the-art of CO$_2$ capture with amino acid salt solutions, Rev. Chem. Eng., 2020, is shown in FIG. 16. FIG. 16 shows that the Sustenol solvent composition had the lowest thermal and oxidative degradation rates among all of the solvent compositions tested.

Figure 17:
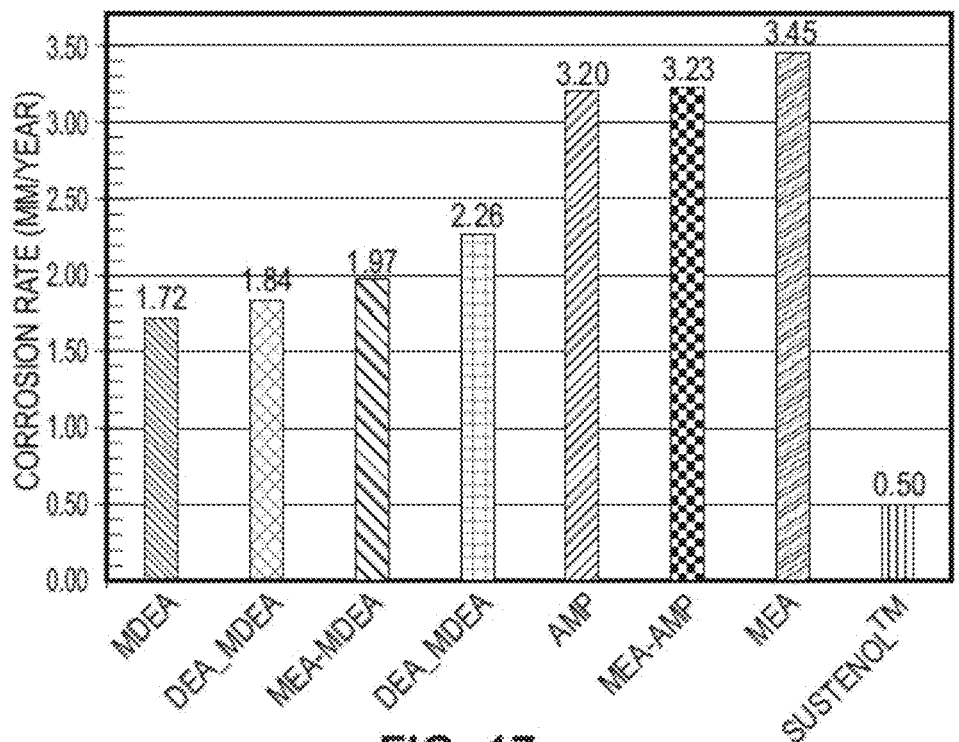
FIG. 17 is a bar graph of carbon steel corrosion rate (mm/year) for MDEA, DEA_MDEA, MEA-MDEA, DEA_MDEA, AMP, MEA-AMP, MEA-AMP, MEA, and Sustenol-11.

The corrosion rate of carbon steel in the Sustenol-11 solvent composition as calculated in accordance with Ramezani, R., Mazinani, S., and DiFelice, R., State-of-the-art of CO$_2$ capture with amino acid salt solutions, Reviews in Chemical Engineering, 38(3), pp. 273-299, 2022, is shown in FIG. 17. FIG. 17 shows that carbon steel corrosion rate is the lowest in the Sustenol-11 solvent composition among all of the solvent compositions tested.

Figure 18:
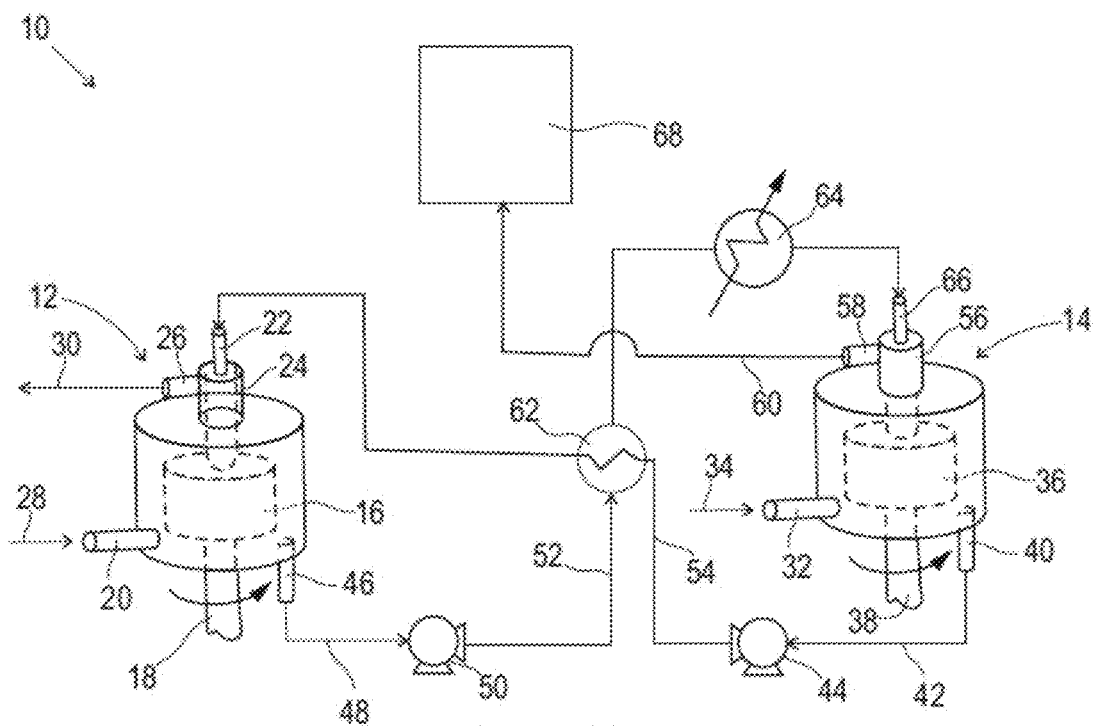
FIG. 18 is a schematic representation of a rotating packed bed $CO_2$ capture system according to one embodiment of the present disclosure, comprising rotating packed bed vessels in which the vessels are arranged for successive alternating absorption and regeneration operation, for continuous $CO_2$ capture operation.

FIG. 18 is a schematic representation of a rotating packed bed CO$_2$ capture system according to one embodiment of the present disclosure, comprising two rotating packed bed vessels in which a first vessel is arranged for absorption of CO$_2$ from a CO$_2$-containing gas using a solvent composition of the present disclosure to yield CO$_2$-reduced gas and CO$_2$-enriched solvent composition, and a second vessel is arranged for regeneration operation to remove CO$_2$ from the CO$_2$-enriched solvent composition produced in the first vessel operation, to yield regenerated (CO$_2$-lean) solvent composition for recirculation to the first vessel, for continuous CO$_2$ capture operation in the two-vessel system.

As shown in FIG. 18, the CO$_2$ capture system 10 includes 2 similarly constructed rotating packed bed vessels 12 and 14 that are arranged for CO$_2$ absorption and CO$_2$ desorption/regeneration, respectively, in which vessel 12 is processing CO$_2$-containing gas for absorption therein, while vessel 14 undergoes desorption/regeneration operation. In such illustrated system, rotating packed bed vessel 12 operates to remove CO$_2$ from CO$_2$-containing gas introduced in feed line 28 to CO$_2$-containing gas inlet 20, from which the CO$_2$-containing gas flows into the interior volume of vessel 12 containing the rotating packed bed 16 which is rotated by rotatable shaft 18 joined to suitable drive machinery (not shown in FIG. 18). The rotating packed bed contains packing providing a large extent of surface area for gas-liquid contacting.

The aqueous solvent composition of the present disclosure is introduced from aqueous solvent composition recirculation line 54 to feed conduit 22 for passage to the rotating packed bed 16. The feed conduit 22 is concentric with and passes through the port assembly 24 of the vessel to the rotating packed bed 16 in which the CO$_2$-containing gas for gas-liquid contacting in the rotating packed bed. The port assembly 24 includes outlet 26 for discharging CO$_2$-reduced gas resulting from the gas-liquid contacting into the effluent line 30 for discharge from the system.

The aqueous solvent composition enriched in CO$_2$ resulting from the gas-liquid contacting in vessel 12 is discharged from the vessel in CO$_2$-enriched aqueous solvent composition outlet 46 and flows in line 48 to pump 50 from which it is discharged into CO$_2$-enriched aqueous solvent composition feed line 52 containing heat exchanger 62 in which the CO$_2$-enriched aqueous solvent composition is heated by regenerated aqueous solvent composition flowing in recirculation line 54 to the feed conduit 22 for passage to the rotating packed bed 16, as previously described. The resulting heated CO$_2$-enriched aqueous solvent composition in feed line 52 then is further heated in heater 64, following which the further heated CO$_2$-enriched aqueous solvent composition in feed line 52 flows into the feed conduit 66 for passage to the rotating packed bed 36 in vessel 14. Vessel 14 is constructed similarly to vessel 12, with the rotating packed bed 36 being rotated by rotatable shaft 38 joined to suitable drive machinery (not shown in FIG. 18).

In vessel 14, the further heated CO$_2$-enriched aqueous solvent composition is discharged into the rotating packed bed 36, which like rotating packed bed 16 contains packing providing a large extent of surface area for gas-liquid contacting. Regeneration steam is introduced into the interior volume of vessel 14 from steam inlet 32 receiving steam from steam feed line 34. The steam contacts the CO$_2$-enriched aqueous solvent composition to cause desorption of CO$_2$ from the CO$_2$-enriched aqueous solvent composition to produce a steam/CO$_2$ fluid that is discharged from the interior volume of vessel 14, flowing through the port assembly 56 of vessel 14 and outlet 58 into CO$_2$-enriched effluent line 60 and then to CO$_2$ processing facility 68, in which the CO$_2$ may be recovered from the steam/CO$_2$ fluid and sent to carbon sequestration and/or processed to manufacture CO$_2$-derived and/or CO$_2$-containing products.

The resulting regenerated CO$_2$-reduced aqueous solvent composition produced by the gas-liquid contacting in vessel 14 then is discharged from vessel 14 in regenerated solvent composition outlet 40 to the regenerated solvent discharge line 42 for flow to pump 44, from which the regenerated solvent flows in aqueous solvent composition recirculation line 54 to feed conduit 22 for passage to the rotating packed bed 16 as previously described. In the recirculation line 54, the regenerated aqueous solvent composition is heat exchanged in heat exchanger 62 with the CO$_2$-enriched aqueous solvent composition flowing in feed line 52 to the vessel 14 as previously described. By such heat exchange, the regenerated aqueous solvent composition is cooled to temperature appropriate for its renewed contacting with CO$_2$-containing gas in vessel 12.

It will be appreciated that in the CO$_2$ capture system 10 as above described, vessel 12 is engaged in CO$_2$ adsorption from CO$_2$-containing gas, while vessel 14 is operated for regeneration of the aqueous solvent composition to renew it for recirculation to vessel 12 for gas-liquid contacting of the regenerated aqueous solvent composition with the CO$_2$-containing gas in vessel 12, thereby enabling continuous operation for CO$_2$ capture from influent CO$_2$-containing gas to be carried out.

It will be apparent that a single rotating packed bed vessel may be correspondingly operated in a cyclic operation, for CO$_2$ adsorption from CO$_2$-containing gas in a first phase of cyclic operation in the vessel, followed by switching of the vessel to regeneration in a second phase of operation, with CO$_2$-enriched aqueous solvent composition resulting from absorption being discharged from the vessel and stored in a storage tank or storage facility during the first phase of operation, and following the first phase of operation, the vessel gas inlet is switched from feeding $CO_2$-containing gas to feeding steam, and the liquid inlet is switched from feeding regenerated solvent (clean solvent) to feeding $CO_2$-enriched aqueous solvent composition resulting from absorption in the first phase, from the storage tank or storage facility, to regenerate the $CO_2$-enriched aqueous solvent composition, which may be flowed from the rotating packed bed vessel to another storage tank or facility for dispensing to the vessel in the renewed first phase of operation.

Such single rotating packed bed vessel may be operated in a batch or semi-continuous manner, e.g., utilizing storage/supply tanks or facilities to provide the $CO_2$-containing gas, regenerated aqueous solvent composition, $CO_2$-containing aqueous solvent composition, and steam to the rotating packed bed to carry out the successive cycles of absorption operation for removing $CO_2$ from the $CO_2$-containing gas and regeneration operation to renew the $CO_2$-containing aqueous solvent composition for the absorption operation.

It will be appreciated that in place of steam, other regeneration gases could be used, as supplied from a regeneration gas source, to effect desorption of $CO_2$ from the $CO_2$-enriched aqueous solvent composition produced by the gas-liquid contacting with the $CO_2$-containing feed gas. Steam, however, is a preferred regeneration gas. Other modes of regeneration of the $CO_2$-enriched aqueous solvent composition produced by the gas-liquid contacting with the $CO_2$-containing feed gas may be employed, such as heating of the $CO_2$-enriched aqueous solvent composition without gas-liquid contacting, but gas-liquid contacting regeneration of the $CO_2$-enriched aqueous solvent composition is preferred, particularly gas-liquid contacting using steam.

It will be further apparent that the foregoing description of rotating packed bed $CO_2$ capture systems is illustrative of particular system arrangements that may be employed in the broad practice of the present disclosure, and that other rotating packed bed $CO_2$ capture systems, as well as other $CO_2$ capture and $CO_2$ abatement systems of varied designs utilizing the aqueous solvent composition of the present disclosure may be employed for absorption of $CO_2$ from a wide variety of $CO_2$-containing fluid streams, within the scope of the present disclosure.

Accordingly, the disclosure in various aspects contemplates an aqueous solvent composition useful for $CO_2$ capture, comprising $CO_2$-sorbing amine and promoter ingredients, and such aqueous solvent composition may optionally include any one or more of the following features: (1) the $CO_2$-sorbing amine comprising one or more amine(s) selected from the group consisting of primary, secondary and tertiary alkylamines and alkanolamines, aromatic amines, mixed amines, polyamines and combinations thereof; (2) the $CO_2$-sorbing amine comprising one or more amine(s) selected from the group consisting of monoethanolamine (MEA), triethanolamine (TEA), diethanolamine (DEA), diethylenetriamine (DETA), 2-(2-aminoethylamino)ethanol, diisopropanolamine, 2-amino-2-methyl-1,3-propanediol, pentaethylenehexamine, piperazine (PZ), benzylamine (BZA), diglycolamine (DGA), tetramethylenepentaamine, tetraethylenepentamine (TEPA), methyldiethanolamine (MDEA), steapolyallylamines, and combinations and mixtures including one or more of the foregoing; (3) the $CO_2$-sorbing amine comprising one or more amine(s) selected from the group consisting of all alkali and alkaline-earth metal amino acid salts, but particularly the water-soluble alkali and alkaline-earth metal common amino acid salts: alanine, arginine, asparagine, aspartic acid, cysteine, glutamic acid, glutamine, glycine, histidine, isoleucine, leucine, lysine, methionine, phenylalanine, proline, serine, taurine, threonine, tryptophan, tyrosine, and valine. (4) the promoters being interactive with the $CO_2$-sorbing amine to enhance at least one of the aqueous solvent composition characteristics of (i) $CO_2$ sorption capacity, (ii) $CO_2$ sorption rate, (iii) $CO_2$ desorption capacity, (iv) $CO_2$ desorption rate, and (v) desorption temperature, in relation to a corresponding aqueous solvent composition lacking the promoters; (5) the promoters comprising one or more promoters(s) selected from the group consisting of all amino acids but particularly the common amino acids: alanine, arginine, asparagine, aspartic acid, cysteine, glutamic acid, glutamine, glycine, histidine, isoleucine, leucine, lysine, methionine, phenylalanine, proline, serine, taurine, threonine, tryptophan, tyrosine, and valine; and (6) the promoters comprising one or more promoters of the formula: $R_1R_2N$—$R_3$—COOH, wherein each of $R_1$, $R_2$ and $R_3$ is independently selected from H, $C_1$-$C_{12}$ alkyl, $C_1$-$C_{12}$ alkoxy, $C_1$-$C_{12}$ carboxy, $C_1$-$C_{12}$ haloalkyl, $C_6$-$C_{12}$ aryl, $C_6$-$C_{14}$ arylalkyl, $C_5$-$C_{10}$ cycloalkyl, amino or substituted amino, thiol, phosphate, sulfate, phosphonate, and sulfonate; such as for example one or more promotors of the formula $R_1R_2N$—$R_3$—COOH, wherein each of $R_1$, $R_2$ and $R_3$ is independently selected from H and $C_1$-$C_{12}$ alkyl.

It is to be understood that the phraseology or terminology employed herein is for description and not of limitation. Therefore, while the embodiments herein have been described in terms of preferred embodiments, those skilled in the art will recognize that the embodiments herein can be practiced with modification within the spirit and scope of the appended claims.

Accordingly, while the disclosure has been set forth herein in reference to specific aspects, features, and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications, and alternative embodiments, within its spirit and scope.

What is claimed is:

1. A method of $CO_2$ capture, comprising:
contacting a $CO_2$-containing gas with a $CO_2$-sorptive aqueous solvent composition to produce $CO_2$-enriched aqueous solvent composition and $CO_2$-reduced gas, wherein the $CO_2$-sorptive aqueous solvent composition comprises:
potassium lysinate (KlyS);
methyldiethanolamine (MDEA);
piperazine (PZ);
at least one additional amine selected from the group consisting of (i) primary, secondary, and tertiary amines, (ii) primary, secondary, and tertiary alkylamines, (iii) primary, secondary, and tertiary alkanolamines, and (iv) cyclic amines; and
a promoter that is effective to enhance reaction of the KlyS and the MDEA with the $CO_2$ from $CO_2$-containing gas when in contact therewith, for $CO_2$ capture producing the $CO_2$-reduced gas, wherein the promoter consists of at least one selected from the group consisting of amino acids, organic acid amines, and compounds of the formula $R_1R_2N$—$R_3$—COOH, wherein each of $R_1$, $R_2$ and $R_3$ is independently selected from H, $C_1$-$C_{12}$ alkyl, $C_1$-$C_{12}$ alkoxy, $C_1$-$C_{12}$ carboxy, $C_1$-$C_{12}$ haloalkyl, $C_6$-$C_{12}$ aryl, $C_6$-$C_{14}$ arylalkyl, $C_5$-$C_{10}$ cycloalkyl, amino or substituted amino, thiol, phosphate, sulfate, phosphonate, and sulfonate.

2. The method of claim 1, wherein the at least one additional amine in the $CO_2$-sorptive aqueous solvent composition is selected from the group consisting of monoethanolamine (MEA), diethanolamine (DEA), aminomethyl propanol (AMP), piperazine (PZ), benzylamine (BZA), diglycolamine (DGA), triethanolamine (TEA), diethylenetriamine (DETA), 2-(2-aminoethylamino) ethanol, diisopropanolamine (DIPA), 2-amino-2-methyl-1,3-propanediol, pentaethylenehexamine, tetramethylenepentaamine, and tetraethylenepentamine (TEPA).

3. The method of claim 1, wherein the at least one additional amine in the $CO_2$-sorptive aqueous solvent composition is selected from the group consisting of primary alkanolamines, secondary alkanolamines, and cyclic amines.

4. The method of claim 1, wherein the at least one additional amine in the $CO_2$-sorptive aqueous solvent composition is selected from the group consisting of MEA, DEA, DGA, AMP, and BZA.

5. The method of claim 1, wherein the KlyS is present in the $CO_2$-sorptive aqueous solvent composition at concentration of 5 to 25% by weight, based on total weight of the $CO_2$-sorptive aqueous solvent composition.

6. The method of claim 1, wherein the KlyS is present in the $CO_2$-sorptive aqueous solvent composition at concentration of 10 to 20% by weight, based on total weight of the $CO_2$-sorptive aqueous solvent composition.

7. The method of claim 1, wherein the MDEA is present in the $CO_2$-sorptive aqueous solvent composition at concentration of 5 to 45% by weight, based on total weight of the $CO_2$-sorptive aqueous solvent composition.

8. The method of claim 1, wherein the promoter consists of at least one selected from the group consisting of amino acids and organic acid amines.

9. The method of claim 1, wherein the promoter consists of at least one selected from the group consisting of amino acids.

10. The method of claim 1, wherein the promoter consists of at least one selected from the group consisting of alanine, arginine, asparagine, aspartic acid, cysteine, glutamic acid, glutamine, glycine, histidine, isoleucine, leucine, lysine, methionine, phenylalanine, proline, serine, taurine, threonine, tryptophan, tyrosine, and valine.

11. The method of claim 1, wherein the promoter consists of at least one selected from the group consisting of organic acid amines.

12. The method of claim 11, wherein the organic acid amine is an amine of an organic acid selected from the group consisting of succinic acid, maleic acid, fumaric acid, and glutamic acid.

13. The method of claim 1, wherein the promoter consists of taurine.

14. The method of claim 13, wherein the taurine is present in the $CO_2$-sorptive aqueous solvent composition at concentration of 0.1 to 10% by weight, based on total weight of the $CO_2$-sorptive aqueous solvent composition.

15. The method of claim 1, wherein the MDEA is present in the $CO_2$-sorptive aqueous solvent composition at concentration of 10 to 25% by weight, based on total weight of the $CO_2$-sorptive aqueous solvent composition.

16. The method of claim 1, wherein water is present in the $CO_2$-sorptive aqueous solvent composition at concentration of 45 to 70% by weight, based on total weight of the $CO_2$-sorptive aqueous solvent composition.

17. The method of claim 1, wherein the promoter is present in the $CO_2$-sorptive aqueous solvent composition at concentration up to 5% by weight, based on total weight of the $CO_2$-sorptive aqueous solvent composition.

18. The method of claim 1, wherein the at least one additional amine in the $CO_2$-sorptive aqueous solvent composition comprises at least one primary or secondary alkanolamine.

19. The method of claim 18, wherein the at least one additional amine in the $CO_2$-sorptive aqueous solvent composition comprises one or more selected from the group consisting of monoethanolamine (MEA), diethanolamine (DEA), aminomethyl propanol (AMP), and diglycolamine (DGA).

20. The method of claim 18, wherein the at least one additional amine in the $CO_2$-sorptive aqueous solvent composition is present at concentration up to 20% by weight, based on total weight of the $CO_2$-sorptive aqueous solvent composition.

21. The method of claim 1, further comprising regenerating the $CO_2$-enriched aqueous solvent composition to remove $CO_2$ therefrom and produce regenerated $CO_2$-sorptive aqueous solvent composition.

22. The method of claim 1, further comprising regenerating the $CO_2$-enriched aqueous solvent composition, wherein the regenerating comprises:
heating the $CO_2$-enriched aqueous solvent composition to desorb $CO_2$ therefrom, to form a regenerated $CO_2$-reduced aqueous solvent composition and desorbed $CO_2$-containing gas;
recovering the desorbed $CO_2$-containing gas; and
recycling the regenerated $CO_2$-reduced aqueous solvent composition to the contacting.

23. The method of claim 22, wherein the $CO_2$-enriched aqueous solvent composition is heated in the regenerating to temperature in a range of from 80° C. to 150° C.

24. The method of claim 22, wherein the recovered desorbed $CO_2$-containing gas comprises water vapor.

25. The method of claim 24, comprising purifying the recovered desorbed $CO_2$-containing gas comprising water vapor, to remove water and impurities therefrom, and produce a purified $CO_2$ gas.

26. The method of claim 25, comprising (i) sequestering the purified $CO_2$ gas in a sequestration locus, or (ii) enhancing hydrocarbon recovery in a hydrocarbon extraction process using the purified $CO_2$ gas.

27. The method of claim 1, wherein the $CO_2$-containing gas that is contacted with the $CO_2$-sorptive aqueous solvent composition in the contacting comprises one or more selected from the group consisting of:
coal-fired power plant flue gas;
natural gas combined cycle power plant flue gas;
blast furnace exhaust gas;
cement plant exhaust gas;
natural gas fired once through steam generator gas;
steam methane reformer syngas;
steam methane reformer flue gas;
steam methane reformer PSA tail gas;
dry reforming syngas;
integrated gasification combined cycle (IGCC) syngas;
biogas;
biomass gasification syngas;
municipal waste gasification syngas;
aluminum smelting off gas;
motive vehicle effluent; and
electrical power-generating plant effluent.

28. A method of $CO_2$ capture, comprising:
contacting a $CO_2$-containing gas with a $CO_2$-sorptive aqueous solvent composition to produce $CO_2$-enriched aqueous solvent composition and $CO_2$-reduced gas,
wherein the $CO_2$-sorptive aqueous solvent composition is selected from the group consisting of the following compositions (I)-(VII):
(I) a composition comprising MDEA, KlyS, AMP, PZ, BZA, MEA, $H_2O$, and taurine (TAU);
(II) a composition comprising MDEA, KlyS, PZ, MEA, $H_2O$, and TAU;
(III) a composition comprising MDEA, KlyS, PZ, DEA, $H_2O$, and TAU;
(IV) a composition comprising MDEA, KlyS, PZ, DGA, DEA, $H_2O$, and TAU;
(V) a composition comprising MDEA, KlyS, AMP, PZ, DGA, $H_2O$, and TAU;
(VI) a composition comprising MDEA, KlyS, PZ, AMP, MEA, $H_2O$, and TAU; and
(VII) a composition comprising MDEA, KlyS, PZ, DGA, $H_2O$, and TAU,
wherein TAU is present in the composition as a promoter in an amount that is effective to enhance reaction of the KlyS and the MDEA with $CO_2$ from $CO_2$-containing gas when in contact therewith.

29. The method of claim 28, wherein the $CO_2$-sorptive aqueous solvent composition is selected from the group consisting of the compositions (II), (III), (IV), and (VI).

30. The method of claim 29, wherein the $CO_2$-sorptive aqueous solvent composition is composition (VII), wherein MDEA is present at concentration of 10 to 25% by weight, KlyS is present at concentration of 10 to 20% by weight, PZ is present at concentration of up to 10% by weight, DGA is present at concentration of up to 10% by weight, H2O is present at concentration of 45 to 70% by weight, and TAU is present at concentration of 0.5 to 10% by weight, wherein each of such percentages by weight is based on total weight of the $CO_2$-sorptive aqueous solvent composition, and wherein the total of the weight percentages of all components of the $CO_2$-sorptive aqueous solvent composition total to 100 weight percent.

* * * * *